(12) United States Patent
Weitz et al.

(10) Patent No.: US 12,545,953 B2
(45) Date of Patent: Feb. 10, 2026

(54) IMMOBILIZATION-BASED SYSTEMS AND METHODS FOR GENETIC ANALYSIS AND OTHER APPLICATIONS

(71) Applicant: President and Fellows of Harvard College, Cambridge, MA (US)

(72) Inventors: David A. Weitz, Cambridge, MA (US); Huidan Zhang, Cambridge, MA (US); John Heyman, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 178 days.

(21) Appl. No.: 17/972,442

(22) Filed: Oct. 24, 2022

(65) Prior Publication Data

US 2025/0215485 A1   Jul. 3, 2025

Related U.S. Application Data

(63) Continuation of application No. 16/094,766, filed as application No. PCT/US2017/028329 on Apr. 19, 2017, now abandoned.

(60) Provisional application No. 62/324,407, filed on Apr. 19, 2016.

(51) Int. Cl.
| | |
|---|---|
| *C12Q 1/6855* | (2018.01) |
| *B01F 23/40* | (2022.01) |
| *B01J 13/02* | (2006.01) |
| *C12Q 1/68* | (2018.01) |
| *C12Q 1/6816* | (2018.01) |
| *C12Q 1/6827* | (2018.01) |

(52) U.S. Cl.
CPC ............ *C12Q 1/6855* (2013.01); *B01F 23/40* (2022.01); *B01J 13/02* (2013.01); *C12Q 1/68* (2013.01); *C12Q 1/6816* (2013.01); *C12Q 1/6827* (2013.01)

(58) Field of Classification Search
CPC ......... C12Q 1/6855; C12Q 1/68; B01F 23/40; B01J 13/02
See application file for complete search history.

(56) References Cited

U.S. PATENT DOCUMENTS

| | | |
|---|---|---|
| 7,041,481 B2 | 5/2006 | Anderson et al. |
| 7,323,305 B2 | 1/2008 | Leamon et al. |
| 7,708,949 B2 | 5/2010 | Stone et al. |
| RE41,780 E | 9/2010 | Anderson et al. |
| 7,842,457 B2 | 11/2010 | Berka et al. |
| 8,337,778 B2 | 12/2012 | Stone et al. |
| 8,765,485 B2 | 7/2014 | Link et al. |
| 9,017,948 B2 | 4/2015 | Weitz et al. |
| 9,029,085 B2 | 5/2015 | Agresti et al. |
| 9,068,210 B2 | 6/2015 | Weitz et al. |
| 9,664,619 B2 | 5/2017 | Boehm et al. |
| 9,816,121 B2 | 11/2017 | Weitz et al. |
| 9,850,526 B2 | 12/2017 | Weitz et al. |
| 10,151,429 B2 | 12/2018 | Weitz et al. |
| 10,221,437 B2 | 3/2019 | Weitz et al. |
| 10,508,294 B2 | 12/2019 | Weitz et al. |
| 10,683,524 B2 | 6/2020 | Weitz et al. |
| 10,738,337 B2 | 8/2020 | Weitz et al. |
| 10,876,156 B2 | 12/2020 | Weitz et al. |
| 10,941,430 B2 | 3/2021 | Weitz et al. |
| 11,052,368 B2 | 7/2021 | Weitz et al. |
| 11,746,367 B2 | 9/2023 | Weitz et al. |
| 2004/0180346 A1 | 9/2004 | Anderson et al. |
| 2005/0130173 A1 | 6/2005 | Leamon et al. |
| 2005/0172476 A1 | 8/2005 | Stone et al. |
| 2006/0040297 A1 | 2/2006 | Leamon et al. |
| 2007/0003442 A1 | 1/2007 | Link et al. |
| 2007/0195127 A1 | 8/2007 | Anh et al. |
| 2008/0176233 A1 | 7/2008 | Nilsen et al. |
| 2008/0241841 A1 | 10/2008 | Murakawa et al. |
| 2009/0197248 A1 | 8/2009 | Griffiths et al. |
| 2010/0069250 A1 | 3/2010 | White, III et al. |
| 2010/0105112 A1 | 4/2010 | Holtz et al. |
| 2010/0124759 A1 | 5/2010 | Wang et al. |
| 2010/0136544 A1 | 6/2010 | Agresti et al. |
| 2010/0172803 A1 | 7/2010 | Stone et al. |
| 2011/0087016 A1 | 4/2011 | Suo |

(Continued)

FOREIGN PATENT DOCUMENTS

| | | |
|---|---|---|
| CN | 1477208 A | 2/2004 |
| CN | 101275164 A | 10/2008 |

(Continued)

OTHER PUBLICATIONS

Canadian Office Action for Application No. CA 2945798 mailed Mar. 3, 2022.

(Continued)

*Primary Examiner* — Sahana S Kaup

(74) *Attorney, Agent, or Firm* — Wolf, Greenfield & Sacks, P.C.

(57) ABSTRACT

The present invention generally relates to microfluidics and labeled nucleic acids. Certain aspects are generally directed to containing cells in gels, such as agarose gels, and determining nucleic acids within the cells, e.g., while contained within the gels. The nucleic acids may be, for example, genomic DNA, mRNA, transcriptomes, or the like. In some embodiments, for instance, both genomic DNA and RNA (e.g., as in a transcriptome) from a cell may be determined. In some cases, the nucleic acids may be attached to beads for sequencing or other purposes. Such systems may be useful, for example, for high-throughput sequencing or other applications.

20 Claims, 8 Drawing Sheets

Specification includes a Sequence Listing.

(56) References Cited

U.S. PATENT DOCUMENTS

| | | |
|---|---|---|
| 2011/0257046 A1 | 10/2011 | Schroeder |
| 2012/0132288 A1 | 5/2012 | Weitz et al. |
| 2012/0164633 A1 | 6/2012 | Laffler |
| 2012/0164652 A1 | 6/2012 | Clemens et al. |
| 2013/0189700 A1 | 7/2013 | So et al. |
| 2013/0225418 A1 | 8/2013 | Watson |
| 2013/0274117 A1 | 10/2013 | Church et al. |
| 2013/0323732 A1 | 12/2013 | Anderson et al. |
| 2014/0057799 A1 | 2/2014 | Church et al. |
| 2014/0199730 A1 | 7/2014 | Weitz et al. |
| 2014/0199731 A1 | 7/2014 | Weitz et al. |
| 2014/0227684 A1 | 8/2014 | Hindson et al. |
| 2015/0057163 A1 | 2/2015 | Rotem et al. |
| 2015/0209785 A1 | 7/2015 | Esmail et al. |
| 2015/0298091 A1* | 10/2015 | Weitz ............. B01F 33/3011 506/28 |
| 2015/0353999 A1 | 12/2015 | Weitz et al. |
| 2015/0376609 A1* | 12/2015 | Hindson ............. C12N 15/1065 |
| 2016/0265043 A1 | 9/2016 | Geng et al. |
| 2017/0009274 A1 | 1/2017 | Abate et al. |
| 2017/0029813 A1 | 2/2017 | Weitz et al. |
| 2017/0183701 A1 | 6/2017 | Weitz et al. |
| 2017/0191127 A1 | 7/2017 | Hodges et al. |
| 2018/0016622 A1 | 1/2018 | Weitz et al. |
| 2018/0023109 A1 | 1/2018 | Weitz et al. |
| 2018/0056293 A1 | 3/2018 | Weitz et al. |
| 2018/0066305 A1 | 3/2018 | Weitz et al. |
| 2018/0087078 A1 | 3/2018 | Weitz et al. |
| 2018/0119212 A1 | 5/2018 | Weitz et al. |
| 2018/0171373 A1 | 6/2018 | Weitz et al. |
| 2019/0127782 A1 | 5/2019 | Regev et al. |
| 2019/0127789 A1 | 5/2019 | Weitz et al. |
| 2019/0330683 A1 | 10/2019 | Link et al. |
| 2019/0351417 A1 | 11/2019 | Bharadwaj et al. |
| 2020/0002741 A1 | 1/2020 | Weitz et al. |
| 2020/0157593 A1 | 5/2020 | Weitz et al. |
| 2021/0254129 A1 | 8/2021 | Weitz et al. |
| 2021/0340597 A1 | 11/2021 | Weitz et al. |
| 2021/0348203 A1 | 11/2021 | Weitz et al. |
| 2023/0045126 A1 | 2/2023 | Weitz et al. |

FOREIGN PATENT DOCUMENTS

| | | | |
|---|---|---|---|
| CN | 102260747 A | 11/2011 | |
| CN | 102648053 A | 8/2012 | |
| CN | 107406886 A | 11/2017 | |
| CN | 108430617 A | 8/2018 | |
| CN | 202211280790.4 | 11/2024 | |
| CN | 202180009121 | 12/2024 | |
| EP | 16765491.2 | 9/2023 | |
| EP | 21741543.9 | 12/2023 | |
| WO | WO 91/09967 A1 | 7/1991 | |
| WO | WO 2004/002627 A2 | 1/2004 | |
| WO | WO 2004/091763 A2 | 10/2004 | |
| WO | WO 2005/021151 A1 | 3/2005 | |
| WO | WO 2006/096571 A2 | 9/2006 | |
| WO | WO 2008/109176 A2 | 9/2008 | |
| WO | WO 2010/033200 A2 | 3/2010 | |
| WO | WO 2010/080134 A1 | 7/2010 | |
| WO | WO 2010/151776 A2 | 12/2010 | |
| WO | WO 2011/056546 A1 | 5/2011 | |
| WO | WO 2012/048341 A1 | 4/2012 | |
| WO | WO 2012/156744 A1 | 11/2012 | |
| WO | WO-2012156744 A2 * | 11/2012 | ......... C12N 15/1075 |
| WO | WO 2013/134261 A1 | 9/2013 | |
| WO | WO 2013/192351 A1 | 12/2013 | |
| WO | WO 2014/047561 A1 | 3/2014 | |
| WO | WO 2014/145555 A1 | 9/2014 | |
| WO | WO 2014/153651 A1 | 10/2014 | |
| WO | WO 2014/186440 A2 | 11/2014 | |
| WO | WO 2014/194131 A2 | 12/2014 | |
| WO | WO 2015/035108 A1 | 3/2015 | |
| WO | WO 2015/103339 A1 | 7/2015 | |
| WO | WO 2015/160919 A1 | 10/2015 | |
| WO | WO 2015/161177 A1 | 10/2015 | |
| WO | WO 2015/161223 A1 | 10/2015 | |
| WO | WO 2015/164212 A1 | 10/2015 | |
| WO | WO 2016/118870 A1 | 7/2016 | |
| WO | WO 2016/149096 A1 | 9/2016 | |
| WO | WO 2017/184707 A1 | 10/2017 | |
| WO | WO 2022/047154 A2 | 3/2022 | |

OTHER PUBLICATIONS

Canadian Office Action for Application No. CA 2945798 mailed Feb. 21, 2023.

Chinese Office Action for Application No. CN 201680015401.1 mailed May 28, 2020.

Chinese Office Action for Application No. CN 201680015401.1 mailed Jan. 5, 2021.

Chinese Office Action for Application No. CN 201680015401.1 mailed Jun. 15, 2021.

International Search Report and Written Opinion for Application No. PCT/US2016/014531 mailed Apr. 1, 2016.

International Preliminary Report on Patentability for Application No. PCT/US2016/014531 mailed Aug. 3, 2017.

Chinese Office Action for Application No. CN 201680027136.9 mailed Feb. 21, 2019.

Chinese Office Action for Application No. CN 201680027136.9 mailed Oct. 12, 2019.

Chinese Office Action for Application No. CN 201680027136.9 mailed Feb. 6, 2020.

Chinese Office Action for Application No. CN 201680027136.9 mailed Feb. 25, 2022.

Chinese Office Action for Application No. CN 201680027136.9 mailed Aug. 25, 2022.

Extended European Search Report for Application No. EP 16765491.2 mailed Jul. 13, 2018.

European Office Action for Application No. 16765491.2 mailed Nov. 18, 2019.

European Office Action for Application No. EP 16765491.2 mailed Aug. 4, 2020.

European Office Action for Application No. EP 16765491.2 mailed Jan. 24, 2022.

International Search Report and Written Opinion for Application No. PCT/US2016/022021 mailed May 23, 2016.

International Preliminary Report on Patentability for Application No. PCT/US2016/022021 mailed Sep. 28, 2017.

International Search Report and Written Opinion for Application No. PCT/US2017/028329 mailed Jul. 26, 2017.

International Preliminary Report on Patentability for Application No. PCT/US2017/028329 mailed Nov. 1, 2018.

International Search Report and Written Opinion dated Mar. 31, 2021 for Application No. PCT/US2021/013231.

International Preliminary Report on Patentability dated Jul. 28, 2022 for Application No. PCT/US2021/013231.

Alix-Panabières et al. Challenges in circulating tumour cell research. Nat Rev Cancer. Sep. 2014;14(9):623-31. doi: 10.1038/nrc3820.

Chang et al., Integrated polymerase chain reaction chips utilizing digital microfluidics. Biomed Microdevices. 2006;8(3):215-225.

Duffy et al.Rapid Prototyping of Microfluidic Systems in Poly(dimethylsiloxane). Anal Chem. Dec. 1, 1998;70(23):4974-4984. doi: 10.1021/ac980656z.

Eastburn et al. Identification and genetic analysis of cancer cells with PCR-activated cell sorting. Nucleic Acids Res. Jul. 2014;42(16):e128. doi: 10.1093/nar/gku606.

Geng et al., Single-cell forensic short tandem repeat typing within microfluidic droplets. Anal Chem. Jan. 7, 2014;86(1):703-12. doi: 10.1021/ac403137h. Epub Nov. 22, 2013.

Leamon et al., A massively parallel PicoTiterPlate based platform for discrete picoliter-scale polymerase chain reactions [published correction appears in Electrophoresis. Apr. 2004;25(7-8):1176]. Electrophoresis. 2003;24(21):3769-3777.

Margulies et al., Genome sequencing in microfabricated high-density picolitre reactors [published correction appears in Nature. May 4, 2006;441(7089):120. Ho, Chun He corrected to Ho, Chun Heen]]. Nature. 2005;437(7057):376-380.

(56) References Cited

OTHER PUBLICATIONS

Mensink et al., Quantitation of minimal residual disease in Philadelphia chromosome positive chronic myeloid leukemia patients using real-time quantitative RT-PCR. Br J Haematol. 1998;102(3):768-774.

Oberholzer et al., Polymerase chain reaction in liposomes. Chem Biol. 1995;2(10):677-682.

Oyola et al. Efficient depletion of host DNA contamination in malaria clinical sequencing. J Clin Microbiol. Mar. 2013;51(3):745-51. doi: 10.1128/JCM.02507-12.

Sepp et al., Microbead display by in vitro compartmentalization: selection for binding using flow cytometry. FEBS Lett. 2002;532(3):455-458.

Tawfik et al., Man-made cell-like compartments for molecular evolution. Nat Biotechnol. 1998;16(7):652-656.

Yan et al., Practical genetic disease diagnosis and prenatal diagnosis technology. Science and Technical Documentation Press. Jul. 21, 2014:98-99. Translation.

Zeng et al., High-performance single cell genetic analysis using microfluidic emulsion generator arrays. Anal Chem. 2010;82(8):3183-3190.

Zhu et al., Highly sensitive and quantitative detection of rare pathogens through agarose droplet microfluidic emulsion PCR at the single-cell level. Lab Chip. 2012;12(20):3907-3913.

Summons to Attend Oral Proceedings dated Jun. 26, 2024 for Application No. EP 16765491.2.

Canadian Office Action mailed Aug. 8, 2024 for Application No. CA 3021735.

Chinese Office Action mailed Jul. 26, 2024 for Application No. CN 202180009121.0.

[No Author Listed] Droplet Digitial™0 PCR Droplet Digital™ PR Applications Guide. Feb. 1, 2010. https://www.bio-rad.com/webroot/web/pdf/lsr/literature/Bulletin_6407.pdf. [Last accessed Jan. 3, 2024].

[No Author Listed] RainDrop Assay Guidelines for RainDrop and RainDrop Pluxs Digital PCR Systems. RainDance Technologies. Dec. 31, 2016. https://www.accela.eu/files/products/124/lcn_50_04334_rev_d_raindrop_assay_guidelines.pdf [last accessed Nov. 22, 2023].

Baker et al., Environmental DNA (eDNA) From the Wake of the Whales: Droplet Digital PCR for Detection and Species Identification. Frontiers in Marine Science. Apr. 19, 2018;5:1-11. doi: 10.3389/fmars.2018.00133.

Basu, Digital Assays Part I: Partitioning Statistics and Digital PCR. SLAS Technol. Aug. 2017;22(4):369-386. doi: 10.1177/2472630317705680. Epub Apr. 27, 2017.

Kopp et al., Loss of Pten and Activation of Kras Synergistically Induce Formation of Intraductal Papillary Mucinous Neoplasia From Pancreatic Ductal Cells in Mice. Gastroenterology. Apr. 2018; 154(5):1509-1523.e5. doi: 10.1053/j.gastro.2017.12.007. Epub Dec. 19, 2017.

Liu et al., Research Status and Trend of Digital PCR based on Microdroplet Technology. Chem Research and App. Jul. 15, 2018;7:1041-47.

Novak et al., Single-cell multiplex gene detection and sequencing with microfluidically generated agarose emulsions. Angew Chem Int Ed Engl. Jan. 10, 2011;50(2):390-5. doi: 10.1002/anie.201006089.

Novak et al., Single-Cell Multiplex Gene Detection and Sequencing with Microfluidically Generated Agarose Emulsions. Angew Chem Int Ed Engl. Jan. 10, 2011;50(2):390-5. https://onlinelibrary.wiley.com/doi/10.1002/anie.201006089. [last accessed 2011]. Supporting information, 11 pages.

Schuler et al., Prevalence and frequency of circulating t(14;18)-MBR translocation carrying cells in healthy individuals. Int J Cancer. Feb. 15, 2009;124(4):958-63. doi: 10.1002/ijc.23958.

U.S. Appl. No. 17/790,450, filed Nov. 20, 2020, Weitz et al.

U.S. Appl. No. 17/790,450, filed Jun. 30, 2022, Weitz et al.

Chinese Office Action mailed Nov. 5, 2024 for Application No. CN 202211280790.4.

European Office Action mailed Sep. 20, 2023 for Application No. EP 16765491.2.

Chinese Office Action mailed Dec. 20, 2024 for Application No. CN 202180009121.

Extended European Search Report mailed Dec. 6, 2023 for Application No. EP 21741543.9.

European Office Action mailed Oct. 30, 2024 for Application No. EP 21741543.9.

Joensson et al., Droplet microfluidics—a tool for single-cell analysis. Angew Chem Int Ed Engl. Dec. 3, 2012;51(49):12176-92. doi: 10.1002/anie.201200460. Epub Nov. 23, 2012.

Maheux et al., Ability of three DNA-based assays to identify presumptive *Escherichia coli* colonies isolated from water by the culture-based mFC agar method. Water Res. Apr. 2011;45(8):2638-46. doi: 10.1016/j.watres.2011.02.021. Epub Feb. 22, 2011.

Yamazaki et al., Multiplex polymerase chain reaction method discriminating *Escherichia coli* and *Shigella* sp. Arch Microbiol. Feb. 2011;193(2):83-7. doi: 10.1007/s00203-010-0647-8.

\* cited by examiner

Step 1: Co-encapsulate cells with lysis buffer and target RNA capture oligonucleotide

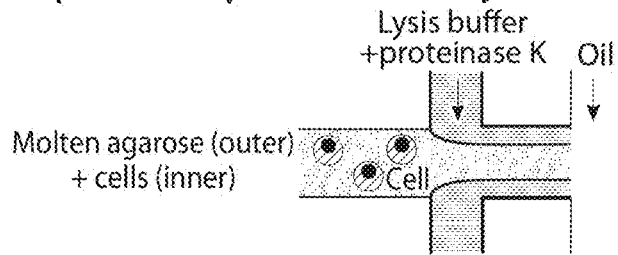

Step 2: Break the emulsion and RT to generate first-strand

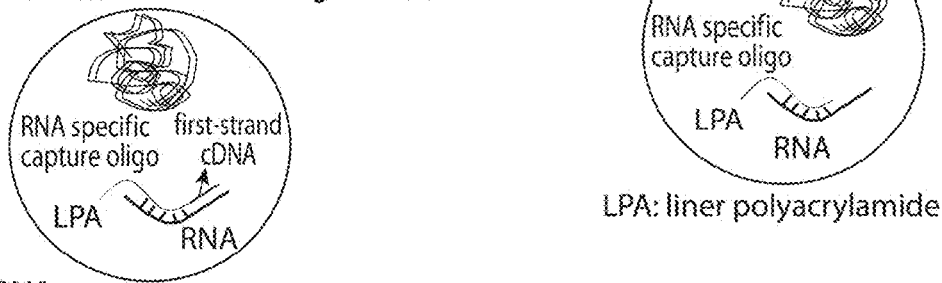

LPA: liner polyacrylamide

Step 3: Digest RNA

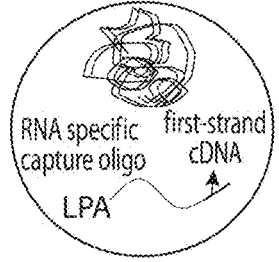

Step 4: Digest dsgDNA using NEBNext® dsDNA Fragmentase®

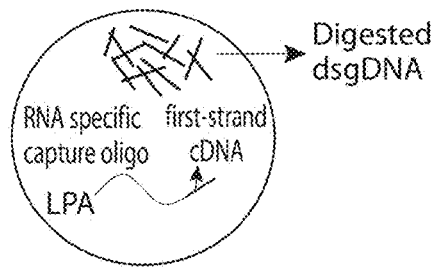

Step 5: Add universal adaptor on one side

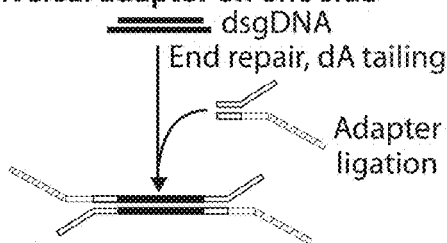

Step 6: Re-emulsify gel particles and amplify
Amplify 1) hundreds of dDNA genes with forward primers and universal adaptor sequence
2) <5 target cDNA with gene specific forward and reverse primers

Step 7: Label amplicons with barcoded gel beads
Merge the drops containing amplicons with barcode beads and ligation

Figure 1

Step 1: Co-encapsulate cells with lysis buffer and oligonucleotide dT

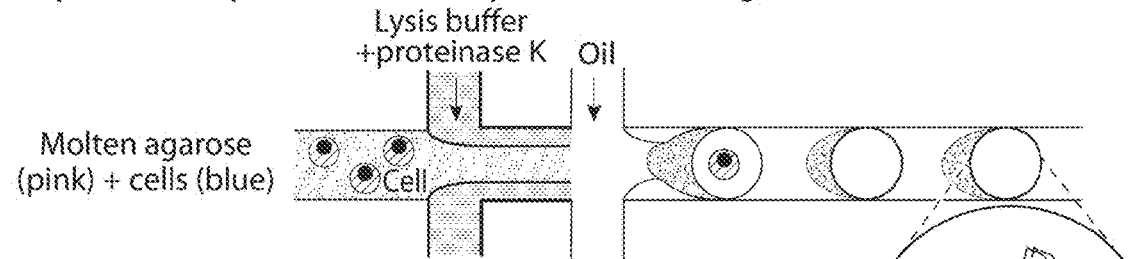

Step 2: Break the emulsion and RT to generate first-strand cDNA

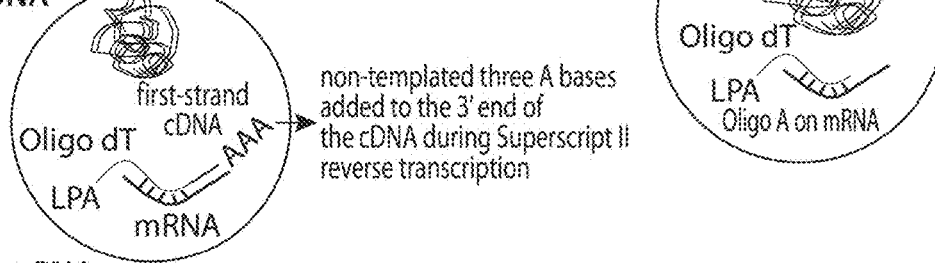

Step 3: Digest mRNA

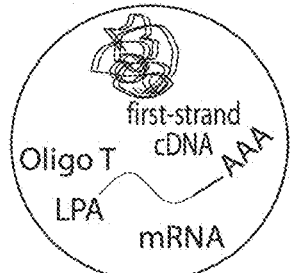

Step 4: Digest dsgDNA using NEBNext® dsDNA Fragmentase

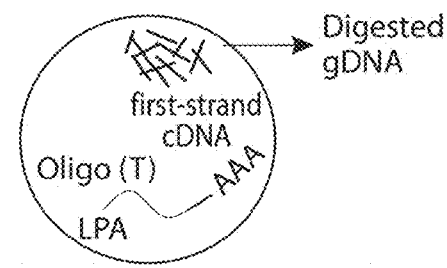

Step 5: Add universal adaptor on one side of the dsgDNA and sscDNA

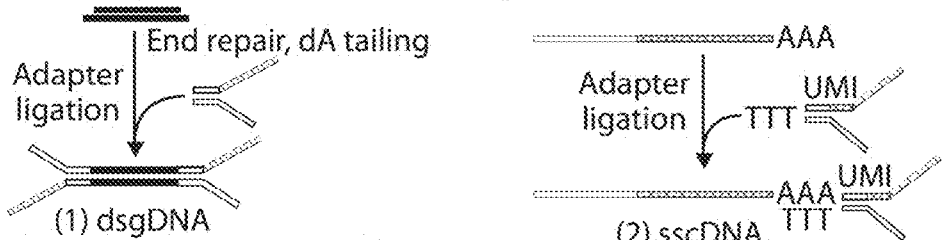

Step 6: Re-emulsify gel particles and amplify
Amplify 1) hundreds of gDNA genes with gene specific primers and universal adaptor sequence
2) hundreds of cDNA with gene specific primers and their universal adaptor sequence

Step 7: Label amplicons with barcoded gel beads
Merge the drops containing amplicons with barcode beads and ligation

Figure 2

Step 1: Co-encapsulate cells with lysis buffer and oligo dT

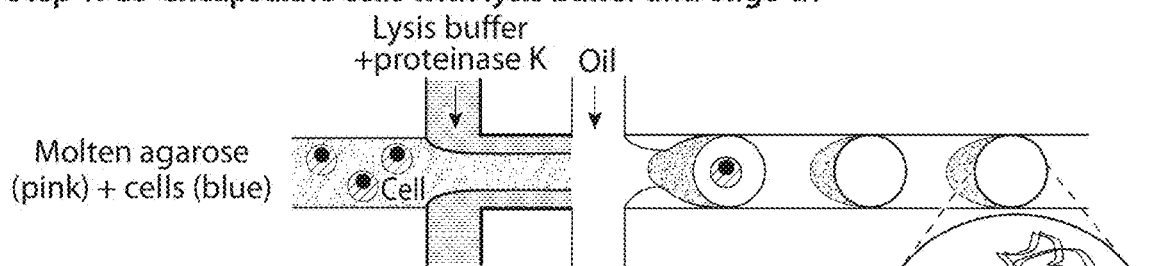

Step 2: Break the emulsion and RT to generate first-strand cDNA

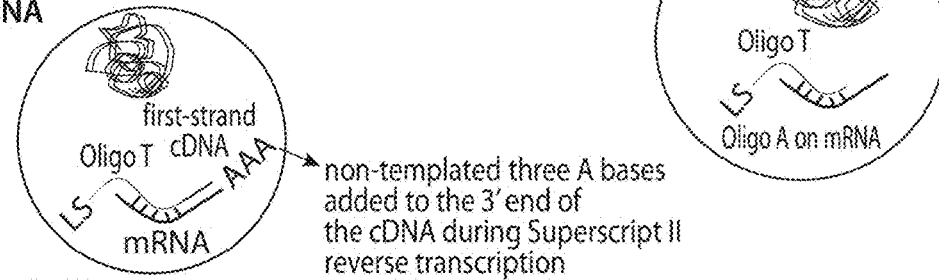

non-templated three A bases added to the 3' end of the cDNA during Superscript II reverse transcription

Step 3: Digest mRNA

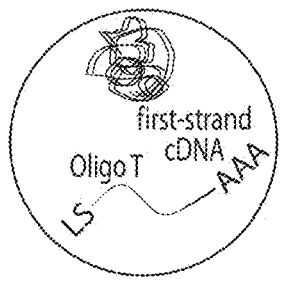

Step 4: Digest dsgDNA with a mixture of restriction enzymes

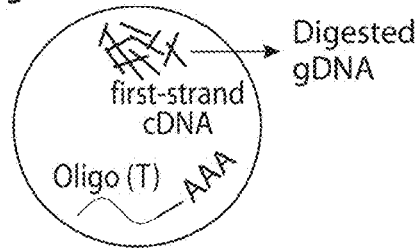

Digested gDNA

Step 5: Add universal adaptor on one side of the dsgDNA

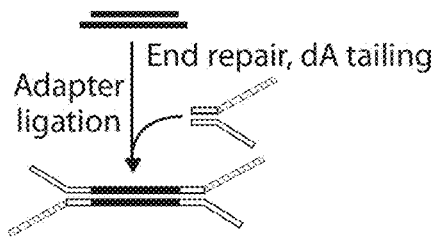

Step 6: Encapsulate individual gel particles into drops
Amplify hundreds of gDNA genes with gene specific primers and universal adaptor sequence.

Step 7: Label amplicons with barcoded gel beads
Merge the drops containing amplicons with barcode beads and ligation

Figure 3

IMMOBILIZATION-BASED SYSTEMS AND METHODS FOR GENETIC ANALYSIS AND OTHER APPLICATIONS

RELATED APPLICATIONS

This application continuation of U.S. application Ser. No. 16/094,766, filed Oct. 18, 2018, entitled "Immobilization-Based Systems and Methods for Genetic Analysis and Other Applications." by Weitz, et al. which is a national stage filing under 35 U.S.C. § 371 of International Patent Application Serial No. PCT/US2017/028329, filed Apr. 19, 2017, entitled "Immobilization-Based Systems and Methods for Genetic Analysis and Other Applications," by Weitz, et al., which claims the benefit of U.S. Provisional Patent Application Ser. No. 62/324,407, filed Apr. 19, 2016, entitled "Immobilization-Based Systems and Methods for Genetic Analysis and Other Applications," by Weitz, et al., each of which is incorporated herein by reference in its entirety.

REFERENCE TO AN ELECTRONIC SEQUENCE LISTING

The contents of the electronic sequence listing (H049870544US03-SEQ-TC.xml; Size: 13,085 bytes; and Date of Creation: Mar. 10, 2023) is herein incorporated by reference in its entirety.

FIELD

The present invention generally relates to microfluidics and labeled nucleic acids.

BACKGROUND

Single-cell transcriptome and genome analysis have been explored intensively and boosted understanding of various biological processes. This may revolutionize human health care, such as significantly improved quality or reduced medical errors. However, transcriptomes and genomes are located in different intracellular spaces and have their own unique properties, so different analysis procedures are usually required when profiling them. Thus, simultaneous profiling of both in a single cell still remains challenging. Such a tool would provide a more comprehensive vision of the cell heterogeneity and may lead to more effective individual therapy.

SUMMARY

The present invention generally relates to microfluidics and labeled nucleic acids. The subject matter of the present invention involves, in some cases, interrelated products, alternative solutions to a particular problem, and/or a plurality of different uses of one or more systems and/or articles.

The invention, according to a first aspect, is generally directed to an article. In one set of embodiments, the article comprises a gel droplet comprising a lysed cell, DNA attached to a first set of oligonucleotides, and RNA attached to a second set of oligonucleotides.

According to another aspect, the present invention is generally directed to a method. In one set of embodiments, the method includes acts of lysing cells within gel droplets to release DNA and RNA from the cells, attaching the DNA to a first set of oligonucleotides, and attaching the RNA to a second set of oligonucleotides.

In another set of embodiments, the method includes acts of lysing a cell within a gel droplet to release RNA from the cell, forming cDNA using the RNA, and attaching the cDNA to an oligonucleotide within the gel droplet.

In another aspect, the present invention encompasses methods of making one or more of the embodiments described herein. In still another aspect, the present invention encompasses methods of using one or more of the embodiments described herein.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1 illustrates an embodiment of the invention generally directed to targeting nucleic acids;

FIG. 2 illustrates another embodiment of the invention generally directed to targeting nucleic acids;

FIG. 3 illustrates yet another embodiment of the invention generally directed to targeting nucleic acids;

DETAILED DESCRIPTION

Figure 4:
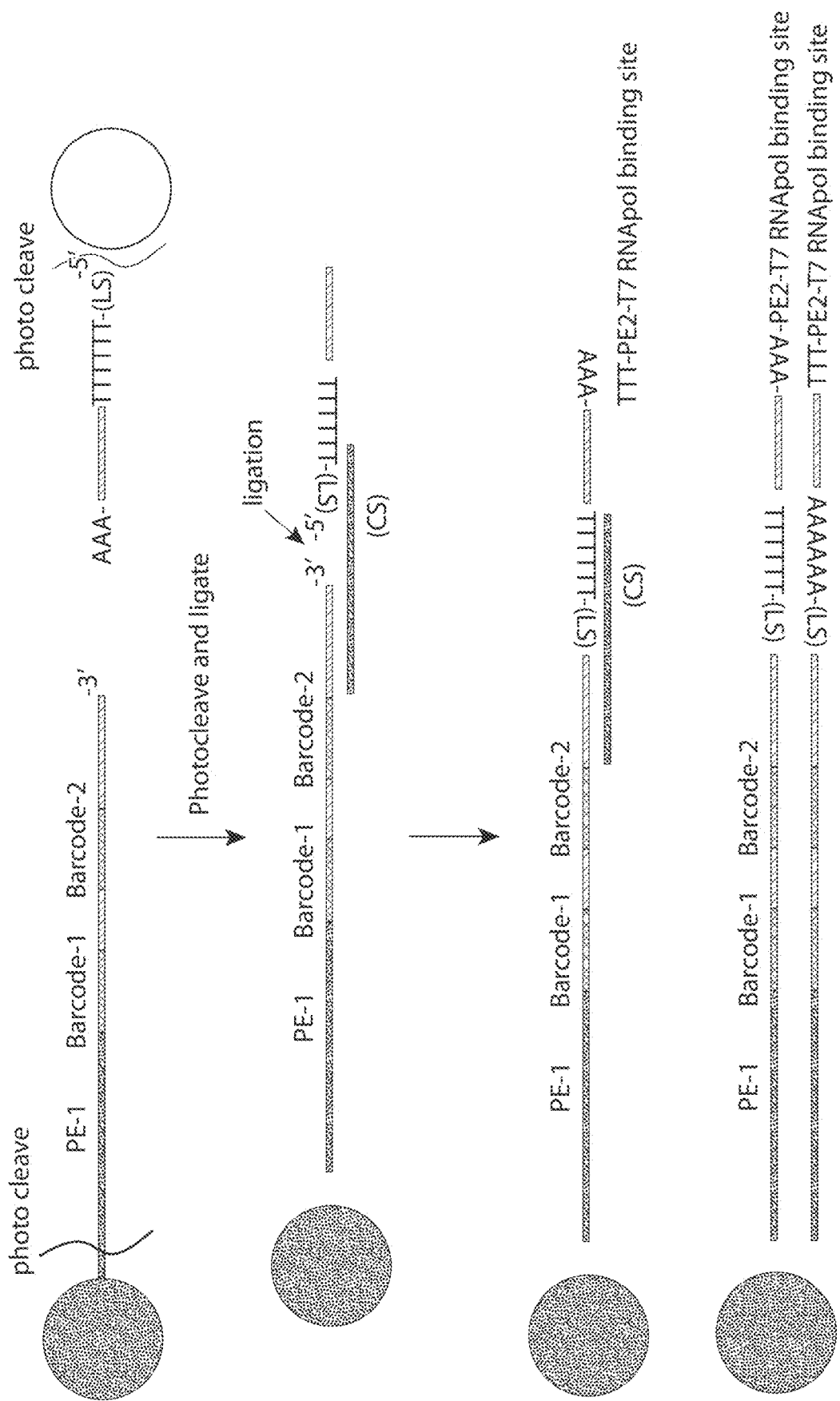
FIG. 4 illustrates still another embodiment of the invention comprising adapter sequences.

The present invention generally relates to microfluidics and labeled nucleic acids. Certain aspects are generally directed to containing cells in gels, such as agarose gels, and determining nucleic acids within the cells, e.g., while contained within the gels. The nucleic acids may be, for example, genomic DNA, mRNA, transcriptomes, or the like. In some embodiments, for instance, both genomic DNA and RNA (e.g., as in a transcriptome) from a cell may be determined. In some cases, the nucleic acids may be attached to beads for sequencing or other purposes. Such systems may be useful, for example, for high-throughput sequencing or other applications.

One aspect of the invention is generally directed to systems and methods for encapsulating a cell in a gel, and lysing the cell to access its nucleic acids. In some cases, the nucleic acids released by the cell may be tagged or attached to oligonucleotides for subsequent determination or analyses, e.g., using various sequencing techniques. The nucleic acids to be determined may include, for example, genomic DNA (gDNA) or mRNA, or in some cases, both from a single cell may be determined. In some cases, a gel may be prepared by preparing a microfluidic droplet containing a cell (or more than one cell), and causing the droplet to form a gel that encapsulates the cell. The cell may be lysed within the gel to release nucleic acids; however, the presence of the gel may prevent or at least reduce the ability of the nucleic acids released by the lysed cell to exit the gel, and thereby remain contained within the gel. Other compounds may be used to interact with the nucleic acids contained within the gel, e.g., for various purposes. For example, various oligonucleotides may be attached to at least some of the nucleic acids, e.g., for subsequent analysis.

One non-limiting example of such a system may be seen in FIG. 1. In this figure, a plurality of cells is contained within a plurality of droplets. In some cases, the cells may be encapsulated at a density of less than 1 cell/droplet (and in some cases, much less than 1 cell/droplet, e.g., as discussed herein) to ensure that most or all of the droplets have only zero or one cell present in them. The droplets also contain components that can be used to form a gel, e.g., agarose in a liquid state, where the agarose can be caused to from a gel via cooling the droplet to below the gelling or solidification temperature of the gel. Other gels are discussed in further detail below. Those of ordinary skill in the art will be aware of various techniques for encapsulating cells within microfluidic droplets; see, for example, U.S. Pat. Nos. 7,708,949, 8,337,778, 8,765,485, or Int. Pat. Apl. Pub. Nos. WO 2004/091763 and WO 2006/096571, each incorporated herein by reference.

After encapsulation of the cell within a droplet, the droplet may be solidified to form a gel (or a gel "droplet") The cells may then be lysed, e.g., upon exposure to a suitable cell lysis reagent, such as proteinase K (or using other techniques such as those discussed herein). Due to the presence of the gel, any nucleic acids released by the cell may stay contained within the gel. In some embodiments, both genomic DNA and RNA released by a cell may be determined. The techniques for capturing and labeling the genomic DNA and the RNA may be different in some cases, e.g., to facilitate identification of the DNA and RNA. The RNA may be, for example, mRNA, siRNA, miRNA, or the like, e.g., as discussed in more detail below. In some cases, the transcriptome of a cell may be determined, e.g., by suitably determining sufficient mRNAs to determine the transcriptome.

In some embodiments, however, both may be labeled with oligonucleotides containing unique "barcodes" (which may be randomly determined, or determined as discussed herein), which may allow in some cases for hundreds, thousands, tens of thousands, or even hundreds of thousands or more of different cells to be barcoded or otherwise labeled in a single experiment. Thus, the nucleic acids from one gel droplet (or from one cell) can still be distinguished from those from other droplets (or other cells) using the oligonucleotide tags. Accordingly, subsequent analysis (e.g., sequencing) of the combined pool of nucleic acids may be performed, and the source of each nucleic acid (e.g., individual cells) may be determined be determining the different oligonucleotides that are present. The oligonucleotides may be present within a droplet prior to formation of a gel from the droplet, or the oligonucleotides may be added to the gel droplet after it has been formed. The oligonucleotides may be added before or after cell lysis.

In some instances, RNA that is released by a cell may be determined. In one set of embodiments, the RNA may be ligated or enzymatically attached to oligonucleotides (such as in a barcode, as mentioned above), e.g., that are present within the gel. Other examples of attaching or joining nucleic acids together are discussed in more detail below. In another set of embodiments, however, the RNA is first converted (i.e., used to produce) to cDNA, then the cDNA is ligated or enzymatically attached to oligonucleotides.

Non-limiting examples of ligases include DNA ligases such as DNA Ligase I, DNA Ligase II, DNA Ligase III, DNA Ligase IV, T4 DNA ligase, T7 DNA ligase, T3 DNA Ligase, *E. coli* DNA Ligase, Taq DNA Ligase, or the like. Many such ligases may be purchased commercially. In addition, in some embodiments, two or more nucleic acids may be ligated together using annealing or a primer extension method. In addition, in some cases, the nucleic acid may be added internally of an oligonucleotide, e.g., using transposons or the like. See, e.g., U.S. Pat. Apl. Ser. No. 62/072,950, incorporated herein by reference in its entirety.

In some cases, all of the RNAs (for example, all of the mRNAs) may be converted into cDNAs (e.g., for the study of the transcriptome), although in other cases, only certain RNAs may be converted into cDNA. The cDNA may be tagged with suitable oligonucleotides, depending on the application.

A variety of techniques may be used to from cDNA, for example, exposure to reverse transcriptase. For instance, specific RNAs (or other nucleic acids) suspected of being within a cell may be targeted using capture oligonucleotides, e.g., containing sequences that can recognize specific RNA's. In such a way, only a portion of the RNA that is released may be converted into cDNA. However, in other embodiments, reverse transcriptase may be applied nonspecifically to the RNA, thereby resulting in the production of cDNA corresponding to all of the RNA. In addition, in some cases, DNA polymerase may be used to convert single-stranded cDNA (e.g., produced by the reverse transcriptase) into double-stranded cDNA.

As a non-limiting example, as is shown in FIG. 1, a linear polyacrylamide containing an oligonucleotide sequence able to recognize an RNA sequence (or a portion of an RNA sequence) may be allowed to interact or associate with the RNA, and used to form a corresponding cDNA sequence, e.g., via a reverse transcriptase reaction. Linear polyacrylamide can be used to precipitate nucleic acids, e.g., of the cDNA sequence. In such a fashion, only RNA that is able to interact with the linear polyacrylamide may be determined, e.g., through formation of cDNA and subsequent attachment of a suitable oligonucleotide.

Thus, in one set of embodiments, RNAs (e.g., released by a cell) may be converted into DNA (e.g., cDNA) using reverse transcriptase. The DNA may then be attached to an adapter sequence. Examples of reverse transcriptases include, but are not limited to AMV, M-MLV, telomerase reverse transcriptase, or the like. Many such reverse transcriptases may be readily obtained commercially, e.g., Superscript, Superscript II, or Superscript III (Life Technologies).

FIG. 2 depicts another example, in which a reverse transcriptase (e.g., Superscript II) that produces an overhang region comprising three non-templated (or unpaired) A bases on the end of the cDNA is used. The overhang region (e.g., comprising adenine in this example) may be matched to sequences that contain a complementary overhang region (e.g., comprising thymine). The overhanging region may contain any suitable number of nucleotides, e.g., 1, 2, 3, 4, 5, etc. The non-templated or unpaired bases on the end may be used advantageously in some embodiments to allow for attachment of a suitable oligonucleotide sequence, e.g., via ligation or other techniques. RNA released by the cell may be used to produce cDNA using the reverse transcriptase enzyme, and the presence of the overhang allows oligonucleotides containing a complementary overhang to be ligated or attached to the cDNA. This may be used, for example, to differentiate cDNA (which contains the overhangs) from genomic DNA (which does not contain such overhangs, and/or contains different overhangs) for the purposes of attaching oligonucleotides. Accordingly, one set of oligonucleotides (e.g., a barcode) may be attached to the cDNA while a different set of oligonucleotides may be attached to the genomic DNA.

As yet another example, some RNAs are produced containing a poly-A region (e.g., a poly-A tail). For instance, the reverse transcriptase may also include non-templated or unpaired bases at an end of the cDNA, e.g. during the reverse transcriptase process. For example, some reverse transcriptases add 3 A bases to the 3' end of the cDNA during the reverse transcriptase process. This can be used advantageously in some embodiments by exposing the RNA to a sequence containing a complementary poly-T region that can interact with the poly-A region of the RNA, as is shown in FIG. 3. Other sequences may be present in the sequence comprising the poly-T region, for example, a "ligation" sequence that can be attached or joined to a suitable oligonucleotide, e.g., by ligation or enzymatic attachment.

A non-limiting example of the use of a ligation sequence is shown with respect to FIG. 4. An oligonucleotide attached to a particle is cleaved (e.g., photocleaved) to release the oligonucleotide from the particle. A nucleic acid such as an mRNA (e.g., having a poly-A tail) is joined to a ligation sequence (e.g., arising from a gel). A portion of the oligonucleotide may contain an adapter sequence that is able to interact or associate with a complementary strand (CS) having a complementary region. For instance, the oligonucleotide may contain a "universal sequence" or an adapter sequence that can be used to attach or include any additional desired sequence to the oligonucleotides (e.g., a recognition sequence that can be used to recognize another entity, for example, a complementary sequence). These may be present or prepared in a bulk phase or within a droplet, such as a microfluidic droplet.

The complementary strand may also contain a portion that is complementary with the ligation sequence, e.g., attached to the nucleic acid (for example, RNA). Thus, interaction of these, following by ligation (e.g., with a suitable ligase) may result in the joining of the nucleic acid to the oligonucleotide.

In addition, in some instances, DNA (e.g., genomic DNA or gDNA) that is released by a cell may be determined, in addition to or instead of RNA. In some cases, e.g., due to the length of genomic nucleic acid, the genomic nucleic acid may be cut into smaller fragments, e.g., using restriction endonucleases or other enzymes able to cut a nucleic acid (e.g., MNase (micrococcal nuclease) enzymes). Many such enzymes are commercially available; one such example is NEBNext® dsDNA Fragmentase®. The enzymes may cleave the DNA into smaller fragments specifically or non-specifically, depending on the enzymes used. In some instances, the DNA may be fragmented or digested mechanically, via sonication, nebulization, exposure to shear forces, or by exposure to suitable chemicals.

In one set of embodiments, the DNA may be subjected to bisulfite treatment, e.g., to determine epigenetic information about the DNA. Treatment of the DNA with bisulfite (or hydrogen sulfite) converts cytosine residues to uracil, but leaves 5-methylcytosine residues unaffected. Thus, bisulfite treatment introduces specific changes in the DNA sequence that depend on the methylation status of individual cytosine residues, yielding single-nucleotide resolution information about the methylation status of the DNA, e.g., for epigenetic information.

In some cases, one or more of the nucleic acids, such as the genomic DNA fragments, may be attached to an adapter sequence that can be attached to oligonucleotides such as those discussed herein. The adapter sequence can be attached to the nucleic acid using ligases or other techniques such as those described herein. For example, in some cases, the adapter sequence may contain an overhang sequence, e.g., one that is complementary to restriction endonucleases or other enzymes used to cleave or fragment the genomic DNA. The adapter sequence may also be one that can be attached to the oligonucleotides, e.g., as discussed herein. For instance, the adapter sequence may contain poly-A regions or other overhang sequences such as those described above, that can be used for attachment to the oligonucleotides.

In some cases, the adapter sequence may also contain one or more unique regions, e.g., barcodes such as those described herein. These may be useful, for example, to allow nucleic acids arising from genomic DNA to be differentiated from nucleic acids arising from RNA such as mRNA from the cell.

Figure 7:
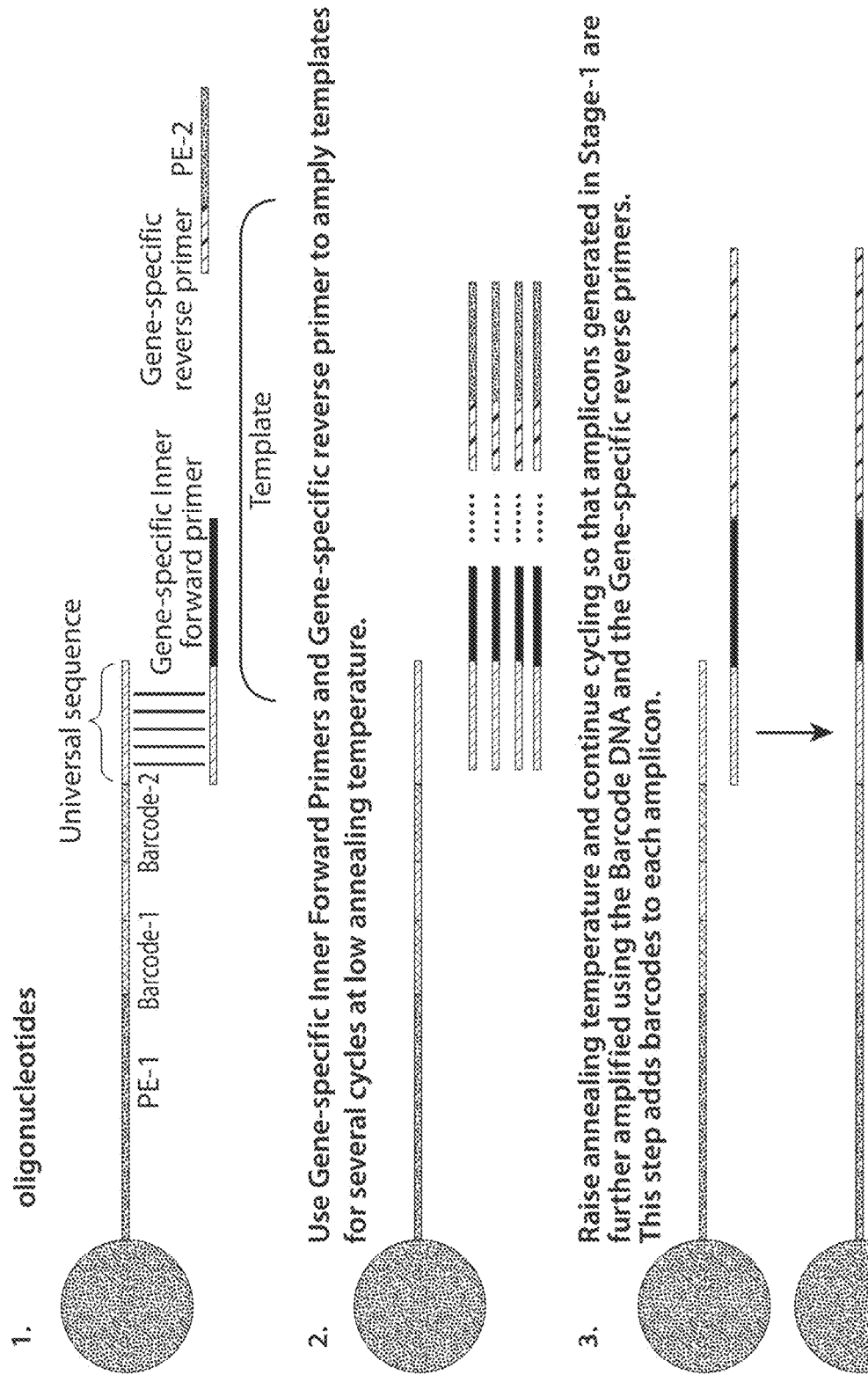
FIG. 7 shows production of labeled nucleic acids, in yet another embodiment.

One non-limiting example of an adapter sequence can be seen in FIG. 7. This figure shows a particle (e.g., a hydrogel particle), one or more barcodes, and a "universal sequence" or an adapter sequence that can be used to attach or include any additional desired sequence to the oligonucleotides (e.g., a recognition sequence that can be used to recognize another entity, for example, a complementary sequence). These may be present or prepared in a bulk phase or within a droplet, such as a microfluidic droplet. In addition, other elements, such as promoters or enhancers may be present within the oligonucleotide as well, e.g., as shown in FIG. 7.

The adaptor sequence may, in some embodiments, be exposed to a complementary sequence comprising a sequence that is complementary to the adapter. Other sequences, e.g., a primer, a promoter, etc. may also be present. Examples of primers, promoters, etc., are discussed herein. The complementary sequence may be able to bind to or otherwise associate with at least a portion of the adapter sequence, such as is shown in FIG. 7. The complementary sequence may be fully complementary or contain one, two, three, or more mismatches, relative to the adapter sequence. The adapter sequence (and its complement) may be of any suitable length, e.g., 4, 5, 6, 7, 8, 9, 10, 11, 12, 13, 14, or 15 or more nucleotides.

For instance, is as shown in FIG. 7, the complementary sequence may include a primer such as a gene-specific inner forward primer or a gene-specific reverse primer sequence, or other sequences as discussed herein. These may be useful, for example, to promote subsequent amplification or incorporation of a nucleic acid to the oligonucleotide, e.g., attached to the particle. In FIG. 7, this is shown as the "template" strand. Thus, the template strand may contain, for instance, nucleic acids arising from RNA (e.g., mRNA) or DNA (e.g., genomic DNA) from a lysed cell.

The primer may be one that is able to interact with the template, e.g., specifically (such as with a gene-specific inner forward primer) or nonspecifically. Subsequent amplification or incorporation, as is shown in FIG. 7, may be used to incorporate the sequence of the template (or at least a portion thereof) into the oligonucleotide attached to the particle, thereby producing particles containing oligonucleotides containing one or more barcode sequences and a sequence corresponding to at least a portion of the template.

Thus, the nucleic acids that are produced (e.g., RNA, cDNA, gDNA, etc.) may be attached to one or more oligonucleotides. This may be performed within the gels themselves in some embodiments. In some cases, the gels may be contained within fluidic droplets and oligonucleotides present within the fluidic droplets may be allowed to diffuse into the gel, e.g., for attachment to the various nucleic acids, e.g., as described above. In some instances, the gels may be first melted to release the nucleic acids (e.g., into the surrounding fluidic droplet) for attachment to the oligonucleotides.

After being brought together, the nucleic acids may be bonded to the oligonucleotides, e.g., covalently, through primer extension, through ligation, or the like. Any of a wide variety of different techniques may be used, and those of ordinary skill in the art will be aware of many such techniques. The exact joining or attachment technique used is not necessarily critical, and can vary between embodiments. Non-limiting examples include ligases or other suitable techniques such as those discussed in U.S. Pat. Apl. Ser. No. 61/981,123, incorporated herein by reference. In some embodiments, the nucleic acids may be joined or attached with the oligonucleotide tags and/or amplified using PCR (polymerase chain reaction) or other amplification techniques. Typically, in PCR reactions, the nucleic acids are heated to cause dissociation of the nucleic acids into single strands, and a heat-stable DNA polymerase (such as Taq polymerase) is used to amplify the nucleic acid. This process is often repeated multiple times to amplify the nucleic acids.

Figure 6:
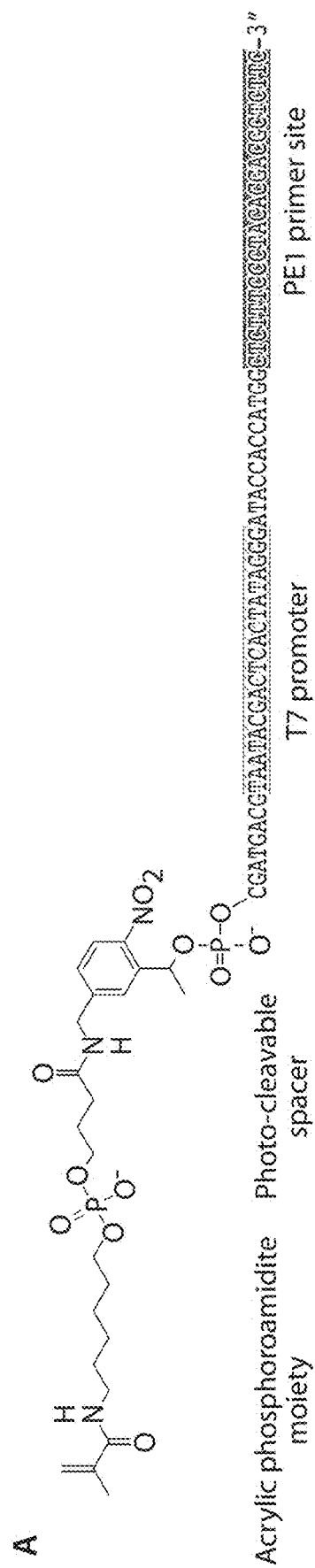
FIG. 6 illustrates a moiety containing a photocleavable spacer or linker, in some embodiments of the invention. The sequence is given by SEQ ID NO: 13.

In some embodiments, the oligonucleotides are introduced by initially joining or attaching the oligonucleotides to a particle (e.g., a hydrogel or a polymeric particle), then subsequently releasing the oligonucleotides from the particle after the particle has been incorporated into a droplet or into the gel. See, e.g., U.S. Pat. Apl. Ser. No. 62/072,944, filed Oct. 30, 2014 or a PCT application filed on Apr. 17, 2015, entitled "Systems and Methods for Barcoding Nucleic Acids," each incorporated herein by reference. For example, in certain embodiments, the oligonucleotides may also contain a cleavable sequence or linker (e.g., as is shown in FIG. 6), or otherwise be releasable from the particles.

The particles may be prepared in some cases such that most or all of the particles have a uniquely distinguishable oligonucleotide, relative to other particles having other distinguishable oligonucleotides). If the particles are present within the droplets at a density of 1 particle/gel droplet (or less), then once the oligonucleotides are released from the particle, then most or all of the gel droplets will contain one unique oligonucleotide (or no unique oligonucleotide), thus allowing each gel droplet (and the nucleic acids contained therein) to be uniquely identified.

Thus, in some embodiments, the particles may be encapsulated in droplets, such as microfluidic droplets. Those of ordinary skill in the art will be aware of techniques for encapsulating particles within microfluidic droplets; see, for example, U.S. Pat. Nos. 7,708,949, 8,337,778, 8,765,485, or Int. Pat. Apl. Pub. Nos. WO 2004/091763 and WO 2006/096571, each incorporated herein by reference. In some cases, the particles may be encapsulated at a density of less than 1 particle/droplet (and in some cases, much less than 1 particle/droplet) to ensure that most or all of the droplets have only zero or one particle present in them.

The particles containing oligonucleotides (which may be attached to the surface of the particles, or otherwise contained or incorporated within the particles, etc.) may be used, in some embodiments, to determine or sequence nucleic acids arising from cells (or other samples), or for other applications. For instance, in the non-limiting example of FIG. 5, a population of cells 10 is desired to be analyzed, e.g., by sequencing their DNA, by identifying certain proteins or genes that may be suspected of being present in at least some of the cells, by determining their mRNA or transcriptome, or the like. Although cells are used in this example as a source of nucleic acid material, this is by way of example, and in other embodiments, the nucleic acid may be introduced into the gels from other sources, or using other techniques.

The cells may first be encapsulated within the microfluidic droplets 40, e.g., using techniques known to those of ordinary skill in the art. The droplets may be used to from gels encapsulating the cells, as previously discussed. In some cases, the cells may be encapsulated at a density of less than 1 cell/droplet (and in some cases, much less than 1 cell/droplet) to ensure that most or all of the gel droplets have only zero or one cell present in them. Thus, as is shown in FIG. 1B, each of gel droplets 41, 42, 43 . . . have either zero or one cell present in them.

Also encapsulated in the gel droplets are oligonucleotide 20, present on particles 30. As noted above, particles 30 may be, for example, microparticles, and may be a hydrogel or a polymeric particle, or other types of particles such as those described herein. The particles and the cells may be encapsulated within the gels simultaneously or sequentially, in any suitable order. In one set of embodiments, each particle contains a unique oligonucleotide, although there may be multiple copies of the oligonucleotide present on a particle. For instance, each of the oligonucleotides may have one or more barcodes. Thus, for example, particle 31 contains only copies of oligonucleotide 21, particle 32 contains only copies of oligonucleotide 22, particle 33 contains only copies of oligonucleotide 33, etc.

Figure 5:
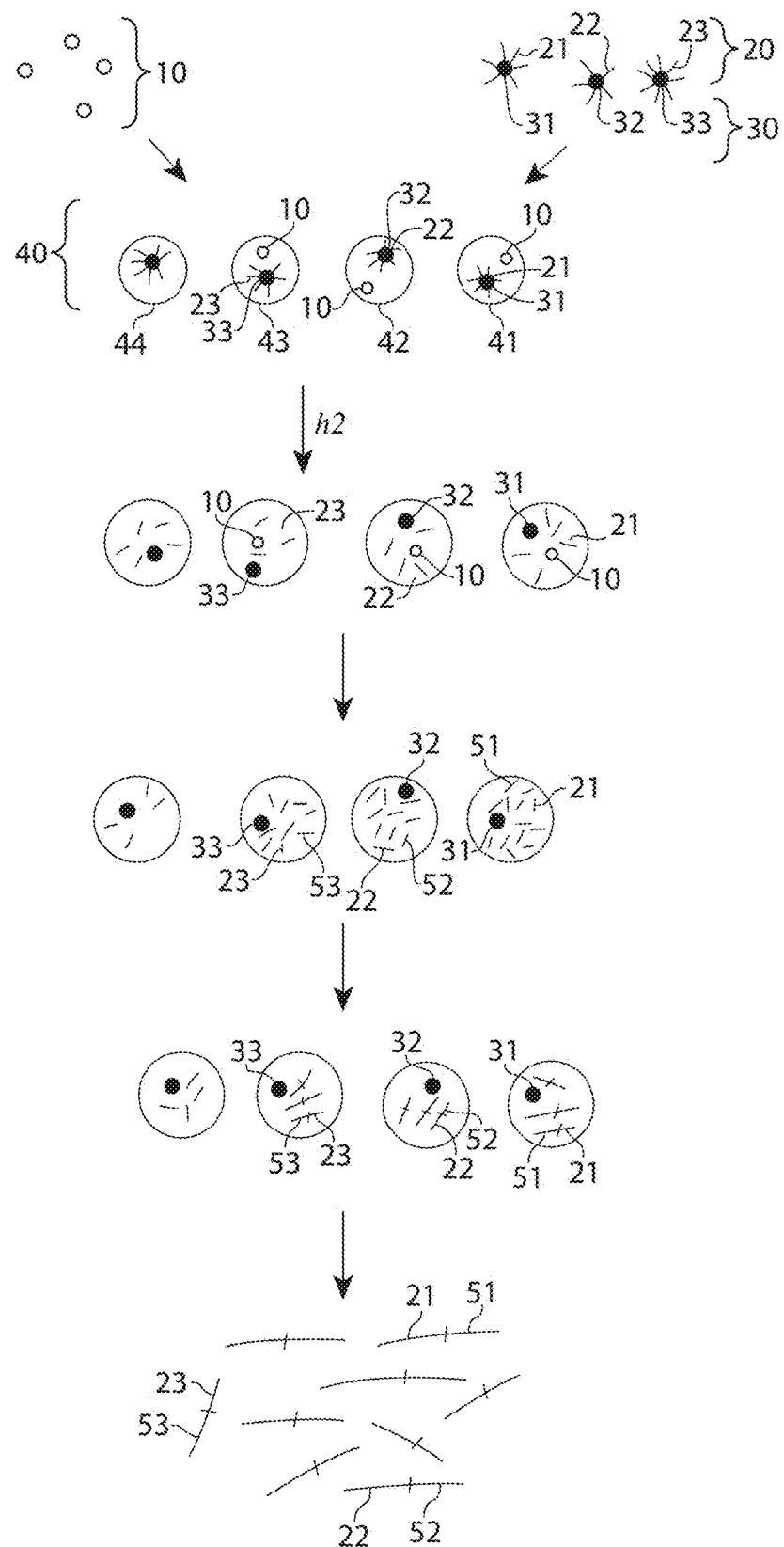
FIG. 5 illustrate an example of labeled nucleic acids, in one set of embodiments.

It should be noted that according to certain embodiments of the invention, the oligonucleotide are initially attached to particles to facilitate the introduction of only one unique oligonucleotide to each gel, as is shown in FIG. 5. (In other embodiments, however, a plurality of oligonucleotides and/or particles may be present in a gel, e.g., containing the same unique barcode.) For example, if the particles are present in the gel at a density of less than 1 particle/gel, then most or all of the gels will each have only a single particle, and thus only a single type of oligonucleotide, that is present. Accordingly, as is shown in FIG. 5, the oligonucleotide may be cleaved or otherwise released from the particles, e.g., such that each gel 41, 42, 43, . . . contains a unique oligonucleotide 21, 22, 23, . . . that is different than the other oligonucleotide that may be present in the other gels. Thus, each oligonucleotide present within a gel will be distinguishable from the oligonucleotides that are present in the other gels. Although light (hv) is used in FIG. 5 to cleave the oligonucleotides from the particles, it should be understood that this is by way of example only, and that other methods of cleavage or release can also be used, e.g., as discussed herein. For example, in one set of embodiments, agarose particles containing oligonucleotides (e.g., physically) may be used, and the oligonucleotides may be released by heating the agarose, e.g., until the agarose at least partially liquefies or softens.

In some cases, the cells are lysed to release nucleic acid or other materials 51, 52, 53, . . . from the cells, e.g., into the gels. For example, the cells may be lysed using chemicals or ultrasound. The cells may release, for instance, DNA, RNA, mRNA, proteins, enzymes or the like. In some cases, the nucleic acids that are released may optionally undergo amplification, for example, by including suitable reagents specific to the amplification method. Examples of amplification methods known to those of ordinary skill in the art include, but are not limited to, polymerase chain reaction (PCR), reverse transcriptase (RT) PCR amplification, in vitro transcription amplification (IVT), multiple displacement amplification (MDA), or quantitative real-time PCR (qPCR).

Some or all of the nucleic acid or other material 51, 52, 53, . . . may be associated with the oligonucleotides present in the gels, e.g., by covalently bonding. For example, the nucleic acid or other material 51, 52, 53 may be ligated or enzymatically attached to the oligonucleotides present in the gels. Thus, as is shown in FIG. 1B, gel 41 exhibits nucleic acids 51 attached to oligonucleotides 21, gel 42 exhibits nucleic acids 52 attached to oligonucleotides 22, gel 43 exhibits nucleic acids 53 attached to oligonucleotides 23, etc. Thus, the nucleic acids within each gel are distinguishable from the nucleic acids within the other gels of the plurality of gels 50 by way of the oligonucleotides, which are unique to each gel in this example.

It should also be understood that although FIG. 5 depicts cleavage of the oligonucleotides from the particles followed by lysis of the cells, in other embodiments, these need not necessarily occur in this order. For example, cell lysis may occur after cleavage, or both may occur simultaneously.

In some embodiments, gels 41, 42, 43, . . . may then be liquefied, or otherwise burst or broken to release their contents, and in some cases, the nucleic acids present in each gel may be combined or pooled together, as is shown in FIG. 5. However, since the nucleic acids are labeled by the different oligonucleotides, the nucleic acids from one gel (i.e., from one cell) can still be distinguished from those from other gels (or other cells) using the oligonucleotides (e.g., by determining barcodes on the oligonucleotides). Accordingly, subsequent analysis (e.g., sequencing) of the combined pool of nucleic acids may be performed, and the source of each nucleic acid (e.g., individual cells) may be determined be determining the different oligonucleotides.

Thus, for example, a population of normal cells and cancer cells (e.g., arising from a tissue sample or biopsy) may be analyzed in such a fashion, and the cancer cells may be identified as having abnormal DNA, even if present in a large pool of normal cells. For example, due to the ability to track DNA on a cellular level using the oligonucleotides, the abnormal DNA can still be identified even if outnumbered by a large volume of normal DNA. As other non-limiting examples, stem cells may be isolated from normal cells, or the isolation of rare cell types in a population of interest may be performed.

The above discussion is not intended to be limiting; other embodiments of the invention are also possible for labeling nucleic acids, e.g., arising from cells. For instance, in certain aspects, the present invention is generally directed to systems and methods for encapsulating cells within a gel. Thus, in some cases, cells may be contained within gels, for example, to protect the cells during manipulation of the cells. For example, one or more cells may be contained within gel particles, which can then be exposed to various conditions, nucleic acids or oligonucleotides, etc., as discussed herein.

In some embodiments, additional agents may also be added to the gels. For example, magnetic particles may be added to some or all of the gels, e.g., to facilitate later sorting. As another example, fluorescent agents may be added to some or all of the gels, e.g., to facilitate identification of certain cells (or other species to be determined) that are contained within the gels. As a non-limiting example, in one set of embodiments, one or more cells may be contained within a gel particle, which may optionally be contained within a droplet.

In one set of embodiments, the gel is an agarose gel. However, other gels are also possible in other embodiments. Other examples of gels encapsulating cells can be seen in Int. Pat. Apl. Pub. No. WO 2008/109176, incorporated herein by reference. Further examples of hydrogels include, but are not limited to acrylamide-based gels, such as polyacrylamide, poly-N-isopropylacrylamide, or poly N-isopropylpolyacrylamide. For example, an aqueous solution of a monomer may be dispersed in a droplet, and then polymerized, e.g., to form a gel. Another example is a hydrogel, such as alginic acid that can be gelled by the addition of calcium ions. In some cases, gelation initiators (ammonium persulfate and TEMED for acrylamide, or $Ca^{2+}$ for alginate) can be added to a droplet, for example, by co-flow with the aqueous phase, by co-flow through the oil phase, or by coalescence of two different drops, e.g., as discussed in U.S. patent application Ser. No. 11/360,845, filed Feb. 23, 2006, entitled "Electronic Control of Fluidic Species," by Link, et al., published as U.S. Patent Application Publication No. 2007/000342 on Jan. 4, 2007; or in U.S. patent application Ser. No. 11/698,298, filed Jan. 24, 2007, entitled "Fluidic Droplet Coalescence," by Ahn, et al.; each incorporated herein by reference in their entireties.

In some embodiments, the gel may be one that is lowmelt, e.g., the gel may melt at temperatures below about 100° C., below about 80° C., below about 70° C., or below about 60° C. in some cases. In some cases, the gel may be chosen to be able to solidify upon exposure to relatively low temperatures, e.g., below about 60° C., below about 50° C., below about 40° C., below about 35° C., below about 30° C., below about 25° C., or below about 20° C. For example, low-melt agarose gels may be readily obtained commercially.

In some embodiments, as non-limiting examples, the average diameter of the gel may be less than about 1 mm, less than about 500 micrometers, less than about 300 micrometers, less than about 200 micrometers, less than about 100 micrometers, less than about 75 micrometers, less than about 50 micrometers, less than about 30 micrometers, less than about 25 micrometers, less than about 20 micrometers, less than about 15 micrometers, less than about 10 micrometers, less than about 5 micrometers, less than about 3 micrometers, less than about 2 micrometers, less than about 1 micrometer, less than about 500 nm, less than about 300 nm, less than about 100 nm, or less than about 50 nm. The average diameter of the gel may also be at least about 30 nm, at least about 50 nm, at least about 100 nm, at least about 300 nm, at least about 500 nm, at least about 1 micrometer, at least about 2 micrometers, at least about 3 micrometers, at least about 5 micrometers, at least about 10 micrometers, at least about 15 micrometers, or at least about 20 micrometers in certain cases. Combinations of these are also possible, e.g., the gel may have an average diameter of between about 25 micrometers and about 100 micrometers.

In some embodiments, a gel may be prepared by containing a cell (or other suitable species) within a microfluidic droplet with a gel precursor. For example, the gel may contain agarose which can form a gel upon exposure to a suitable temperature, or some gels may be prepared by containing a precursor such as disclosed herein and exposing the precursor to a suitable gelation initiator.

If cells are used, the cells may arise from any suitable source. For instance, the cells may be any cells for which nucleic acid from the cells is desired to be studied or sequenced, etc., and may include one, or more than one, cell type. The cells may be for example, from a specific population of cells, such as from a certain organ or tissue (e.g., cardiac cells, immune cells, muscle cells, cancer cells, etc.), cells from a specific individual or species (e.g., human cells, mouse cells, bacteria, etc.), cells from different organisms, cells from a naturally-occurring sample (e.g., pond water, soil, etc.), or the like. In some cases, the cells may be dissociated from tissue.

In some cases, a gel encapsulating a cell (or more than one cell) may be prepared by preparing a droplet, such as a microfluidic droplet, containing the cell, then causing the droplet to solidify or harden into a gel. For example, agarose gel may be hardened by cooling to a suitable temperature.

The gel (or droplet) may have a volume of, for example less than about 1 ml, less than about 300 microliters, less than about 100 microliters, less than about 30 microliters, less than about 10 microliters, less than about 3 microliters, less than about 1 microliter, less than about 500 nl, less than about 300 nl, less than about 100 nl, less than about 50 nl, less than about 30 nl, or less than about 10 nl.

In one set of embodiments, the gel or droplet may, on the average, contain less than one cell in it. For example, the average loading rate may be less than about 1 particle/gel (or droplet), less than about 0.9 cell/gel, less than about 0.8 cell/gel, less than about 0.7 cell/gel, less than about 0.6 cell/gel, less than about 0.5 cell/gel, less than about 0.4 cell/gel, less than about 0.3 cell/gel, less than about 0.2 cell/gel, less than about 0.1 cell/gel, less than about 0.05 cell/gel, less than about 0.03 cell/gel, less than about 0.02 cell/gel, or less than about 0.01 cell/gel. As discussed, droplets may be produced containing cells, then converted into gel droplets containing the cells; thus, the average loading rate for gels and droplets may be substantially the same. In some cases, lower loading rates may be chosen to minimize the probability that a gel (or droplet) will be produced having two or more cells in it. Thus, for example, at least about 50%, at least about 60%, at least about 70%, at least about 80%, at least about 90%, at least about 95%, at least about 97%, at least about 98%, or at least about 99% of the gels (or droplets) may contain either no cell or only one cell.

In some cases, a relatively large number of gels or droplets may be created, e.g., at least about 10, at least about 30, at least about 50, at least about 100, at least about 300, at least about 500, at least about 1,000, at least about 3,000, at least about 5,000, at least about 10,000, at least about 30,000, at least about 50,000, at least about 100,000 gels or droplets, etc.

In some embodiments, cells may be lysed within the gels. The cell may release nucleic acids upon lysis, for example, DNA or RNA. The DNA may be genomic DNA in some cases. The RNA may be, for instance, mRNA, siRNA, miRNA, tRNA, rRNA, or the like. In one set of embodiments, the cells may be lysed within the droplets, e.g., to release DNA and/or RNA from the cell, and/or to produce a cell lysate. For instance, the cells may be lysed via exposure to a lysing chemical or a cell lysis reagent (e.g., a surfactant such as Triton-X or SDS, an enzyme such as lysozyme, lysostaphin, zymolase, cellulase, mutanolysin, glycanases, proteases, mannase, proteinase K, etc.), or a physical condition (e.g., ultrasound, ultraviolet light, mechanical agitation, etc.). If a lysing chemical is used, the lysing chemical may be introduced into the gel before or after formation of the gel, e.g., through picoinjection or other methods such as those discussed in U.S. Pat. Apl. Ser. No. 13/379,782, filed Dec. 21, 2011, entitled "Fluid Injection," published as U.S. Pat. Apl. Pub. No. 2012/0132288 on May 31, 2012, incorporated herein by reference in its entirety, through fusion of a droplet with a droplet containing the chemical or enzyme, or through other techniques known to those of ordinary skill in the art. In some cases, lysing a cell will cause the cell to release its contents, e.g., cellular nucleic acids, proteins, enzymes, sugars, etc.

As discussed above, certain aspects of the invention are generally directed to systems and methods for attaching nucleic acids (e.g., released from cells, or otherwise present within a gel or a droplet) to oligonucleotides, such as those described herein. The oligonucleotides may be attached to a particle in some embodiments, although they need not be in other embodiments. In some cases, the gel and the oligonucleotides may be contained within a fluidic droplet. As previously discussed, in some cases, there may be a plurality of droplets containing various oligonucleotides such that the oligonucleotides of one droplet are distinguishable from oligonucleotides in other droplets, e.g., due to the presence of one or more barcodes. In some embodiments, after attaching the nucleic acids to the oligonucleotides, they may be sequenced or otherwise analyzed. In some cases, they may also be combined or merged together, e.g., by bursting or otherwise disrupting the droplets, then sequenced or otherwise analyzed together.

For instance, as discussed herein, nucleic acids arising from a cell (e.g., within a gel droplet) may be attached to an oligonucleotide, e.g., for subsequent sequencing or analysis. As discussed below, the oligonucleotide may be attached to or otherwise incorporated or contained within a particle. In one set of embodiments, the nucleic acid may be added to the oligonucleotide using a ligase or other suitable enzyme that can directly attach the nucleic acid to the oligonucleotides, e.g., to a free end of the oligonucleotide. See, e.g., U.S. Pat. Apl. Ser. No. 62/072,944, filed Oct. 30, 2014 or a PCT application filed on Apr. 17, 2015, entitled "Systems and Methods for Barcoding Nucleic Acids," each incorporated herein by reference.

In some embodiments, the nucleic acid and the oligonucleotide may have straight or "sticky" ends, e.g., containing overhangs of unpaired nucleotides that may be complementary. In some cases, restriction enzymes may be used to prepare the ends of the nucleic acids prior to joining.

Thus, for example, the nucleic acid may contain a portion of unpaired nucleotides, and the oligonucleotide may contain a complementary portion of unpaired nucleotides. As a non-limiting example, the overhang may be an A and the complement may be a T. The overhanging region may contain any suitable number of nucleotides, e.g., 1, 2, 3, 4, 5, 6, 7, 8, 9, 10, etc. The overhang region may contain only a single nucleotide (e.g., A, AA, AAA, etc.) or a random or any other sequence of suitable nucleotides. In some cases, the overhang may be created using a suitable enzyme, e.g., a restriction endonuclease or a reverse transcriptase.

For instance, in one non-limiting embodiment, the 3' end of a barcoded primer is terminated with a poly-T sequences that may be used to capture cellular mRNA for whole-transcriptome profiling. The resulting library combining all cells can optionally be enriched using PCR-based methods or using hybridization capture-based methods (such as Agilent SureSelect), e.g., to allow sequencing of only a sub-set of genes of interest. In another embodiment, the 3' end of the barcoded primers may terminate with a random DNA sequence that can be used to capture the RNA in the cell. In another embodiment, the 3' end of the barcoded primers may terminate with a specific DNA sequence, e.g., that can be used to capture DNA or RNA species ("genes") of interest, or to hybridize to a DNA probe that is delivered into the droplets in addition to the particles or microspheres, for example, together with the enzyme reagents. In another embodiment, a particle or microsphere may carry a number of different primers to target several genes of interest. Yet another embodiment is directed to optimization of the size of droplets and the concentration of reaction components required for droplet barcoding.

In another set of embodiments, a nucleic acid may be attached to an oligonucleotide using a sequence that is complementary to an adapter sequence on the oligonucleotide, where the complementary sequence contains a primer that can be used to amplify or incorporate a desired or arbitrary sequence (e.g., a template) to the oligonucleotide.

For instance, in some embodiments, a template may be introduced into a droplet and amplified within the droplet. If the droplet contains oligonucleotides, then the amplification process may also be used to attach the template to the oligonucleotide, e.g., via a complementary sequence containing primers able to recognize at least a portion of the template. For example, the oligonucleotide may contain a "universal" or adapter sequence, which is complementary to a complementary sequence containing a portion complementary to the adapter sequence and a primer able to recognize at least a portion of the template. Upon amplification within the droplet, the oligonucleotide may thus be extended, e.g., to contain the template. Thus, upon amplification, the template sequence may become incorporated into the oligonucleotide, e.g., as is shown in FIG. 1, and the primer may be used to facilitate amplification or joining of a template strand or other sequences to the oligonucleotide. For example, this process may be facilitated using primers such as gene-specific primers (forward or reverse) within the complementary sequence.

The oligonucleotide to which the nucleic acid is attached to may contain, for example, barcode sequences, recognition sequences, cleavable linkages, random sequences, or other sequences such as any of those discussed herein. For example, in one set of embodiments, the nucleic acids may be attached to specific oligonucleotides (e.g., barcodes") that can be used to distinguish nucleic acids from one source (e.g., from a cell contained within a droplet) from those from other sources (e.g., from other cells). One or more than one barcode may be present on an oligonucleotide.

In some embodiments, the oligonucleotides may comprise a "barcode" or a unique sequence. The sequence may be selected such that some or most of the oligonucleotides (e.g., present on a particle and/or in a droplet) have the unique sequence (or combination of sequences that is unique), but other oligonucleotides (e.g., on other particles or droplets) do not have the unique sequence or combination of sequences. Thus, for example, the sequences may be used to uniquely identify or distinguish a droplet, or nucleic acid contained arising from the droplet (e.g., from a lysed cell) from other droplets, or other nucleic acids (e.g., released from other cells) arising from other droplets.

The sequences may be of any suitable length. The length of the barcode sequence is not critical, and may be of any length sufficient to distinguish the barcode sequence from other barcode sequences. One, two, or more "barcode" sequence may be present in an oligonucleotide, as discussed above. A barcode sequence may have a length of 5, 6, 7, 8, 9, 10, 11, 12, 13, 14, 15, 16, 17, 18, 19, 20, 21, 22, 23, 24, or 25 nt. More than 25 nucleotides may also be present in some cases.

In some cases, the unique or barcode sequences may be taken from a "pool" of potential barcode sequences. If more than one barcode sequence is present in an oligonucleotide, the barcode sequences may be taken from the same, or different pools of potential barcode sequences. The pool of sequences may be selected using any suitable technique, e.g., randomly, or such that the sequences allow for error detection and/or correction, for example, by being separated by a certain distance (e.g., Hamming distance) such that errors in reading of the barcode sequence can be detected, and in some cases, corrected. The pool may have any number of potential barcode sequences, e.g., at least 100, at least 300, at least 500, at least 1,000, at least 3,000, at least 5,000, at least 10,000, at least 30,000, at least 50,000, at least 100,000, at least 300,000, at least 500,000, or at least 1,000,000 barcode sequences.

Thus, some embodiments of the present invention are generally directed to barcoded nucleic acids attached to particles or microspheres. For example, one set of embodiments is generally directed to particles or microspheres carrying nucleic acid fragments (each encoding a barcode, a primer, and/or other sequences possibly used for capture, amplification and/or sequencing of nucleic acids). Microspheres may refer to a hydrogel particle (polyacrylamide, agarose, etc.), or a colloidal particle (polystyrene, magnetic or polymer particle, etc.) of 1 to 500 micrometer in size, or other dimensions such as those described herein. The microspheres may be porous in some embodiments. Other suitable particles or microspheres that can be used are discussed in more detail herein.

The preparation of particles or microspheres, in some cases, may rely on the covalent attachment or other techniques of incorporation of an initial DNA oligonucleotide to the particles or microspheres, followed by enzymatic extension of each oligonucleotide by one or more barcodes selected, e.g., at random, from a pre-defined pool. The final number of possible unique barcodes may depend in some cases on the size of the pre-defined barcode pool and/or on the number of extension steps. For example, using a pool of 384 pre-defined barcodes and 2 extension steps, each particle or microsphere carries one of $384^2=147{,}456$ possible barcodes; using 3 extension steps, each particle or microsphere carries one of $384^3=56{,}623{,}104$ possible barcodes; and so on. Other numbers of steps may also be used in some cases; in addition, each pool may have various numbers of pre-defined barcodes (not just 384), and the pools may have the same or different numbers of pre-defined barcodes. The pools may include the same and/or different sequences.

Accordingly, in some embodiments, the possible barcodes that are used are formed from one or more separate "pools" of barcode elements that are then joined together to produce the final barcode, e.g., using a split-and-pool approach. A pool may contain, for example, at least about 300, at least about 500, at least about 1,000, at least about 3,000, at least about 5,000, or at least about 10,000 distinguishable barcodes. For example, a first pool may contain $x_1$ elements and a second pool may contain $x_2$ elements; forming a barcode containing an element from the first pool and an element from the second pool may yield, e.g., $x_1x_2$ possible barcodes that could be used. It should be noted that $x_1$ and $x_2$ may or may not be equal. This process can be repeated any number of times; for example, the barcode may include elements from a first pool, a second pool, and a third pool (e.g., producing $x_1x_2x_3$ possible barcodes), or from a first pool, a second pool, a third pool, and a fourth pool (e.g., producing $x_1x_2x_3x_4$ possible barcodes), etc. There may also be 5, 6, 7, 8, or any other suitable number of pools. Accordingly, due to the potential number of combinations, even a relatively small number of barcode elements can be used to produce a much larger number of distinguishable barcodes.

In some cases, such use of multiple pools, in combination, may be used to create substantially large numbers of useable barcodes, without having to separately prepare and synthesize large numbers of barcodes individually. For example, in many prior art systems, requiring 100 or 1,000 barcodes would require the individual synthesis of 100 or 1,000 barcodes. However, if larger numbers of barcodes are needed, e.g., for larger numbers of cells to be studied, then correspondingly larger numbers of barcodes would need to be synthesized. Such systems become impractical and unworkable at larger numbers, such as 10,000, 100,000, or 1,000,000 barcodes. However, by using separate "pools" of barcodes, larger numbers of barcodes can be achieved without necessarily requiring each barcode to be individually synthesized. As a non-limiting example, a first pool of 1,000 distinguishable barcodes (or any other suitable number) and a second pool of 1,000 distinguishable barcodes can be synthesized, requiring the synthesis of 2,000 barcodes (or only 1,000 if the barcodes are re-used in each pool), yet they may be combined to produce 1,000×1,000=1,000,000 distinguishable barcodes, e.g., where each distinguishable barcode comprises a first barcode taken from the first pool and a second barcode taken from the second pool. Using 3, 4, or more pools to assemble the barcode may result in even larger numbers of barcodes that may be prepared, without substantially increasing the total number of distinguishable barcodes that would need to be synthesized.

Thus, in some cases, some or all of the gels may be distinguishable, e.g., on the basis of the oligonucleotides (e.g., which may comprise one or more unique sequences or barcodes). In some cases, at least about 50%, at least about 60%, at least about 70%, at least about 80%, at least about 90%, at least about 95%, at least about 97%, at least about 98%, or at least about 99% of the gels may be distinguishable.

The oligonucleotide may be of any suitable length or comprise any suitable number of nucleotides. The oligonucleotide may comprise DNA, RNA, and/or other nucleic acids such as PNA, and/or combinations of these and/or other nucleic acids. In some cases, the oligonucleotide is single stranded, although it may be double stranded in other cases. For example, the oligonucleotide may have a length of at least about 10 nt, at least about 30 nt, at least about 50 nt, at least about 100 nt, at least about 300 nt, at least about 500 nt, at least about 1000 nt, at least about 3000 nt, at least about 5000 nt, at least about 10,000 nt, etc. In some cases, the oligonucleotide may have a length of no more than about 10,000 nt, no more than about 5000 nt, no more than about 3000 nt, no more than about 1000 nt, no more than about 500 nt, no more than about 300 nt, no more than about 100 nt, no more than about 50 nt, etc. Combinations of any of these are also possible, e.g., the oligonucleotide may be between about 10 nt and about 100 nt. The length of the oligonucleotide is not critical, and a variety of lengths may be used in various embodiments.

The oligonucleotide may also contain a variety of sequences. For example, the oligonucleotide may contain one or more primer sequences, one or more unique or "barcode" sequences as discussed herein, one or more promoter sequences, one or more spacer sequences, or the like. The oligonucleotide may also contain, in some embodiments one or more cleavable spacers, e.g., photocleavable linker. The oligonucleotide may in some embodiments be attached to a particle chemically (e.g., via a linker) or physically (e.g., without necessarily requiring a linker), e.g., such that the oligonucleotides can be removed from the particle via cleavage. Other examples include portions that may be used to increase the bulk (or length) of the oligonucleotides (e.g., using specific sequences or nonsense sequences), to facilitate handling (for example, an oligonucleotide may include a poly-A tail), to increase selectivity of binding (e.g., as discussed below), to facilitate recognition by an enzyme (e.g., a suitable ligase), to facilitate identification, or the like. Examples of these and/or other sequences are described in further detail herein.

In one set of embodiments, the oligonucleotide tag may comprise an antibody, e.g., that can specifically bind to a protein suspected of being present in the cell (or droplet). For example, the droplet may contain one or more antibodies tagged with an oligonucleotide tag as described herein.

In some cases, the oligonucleotide may contain one or more promoter sequences, e.g., to allow for production of the oligonucleotide, to allow for enzymatic amplification, or the like. Those of ordinary skill in the art will be aware of primer sequences, e.g., P5 or P7. Many such primer sequences are available commercially. Examples of promoters include, but are not limited to, T7 promoters, T3 promoters, or SP6 promoters.

In some cases, the oligonucleotide may contain one or more primer sequences. Typically, a primer is a single-stranded or partially double-stranded nucleic acid (e.g., DNA) that serves as a starting point for nucleic acid synthesis, allowing polymerase enzymes such as nucleic acid polymerase to extend the primer and replicate the complementary strand. A primer may be complementary to and to hybridize to a target nucleic acid. In some embodiments, a primer is a synthetic primer. In some embodiments, a primer is a non-naturally-occurring primer. A primer typically has a length of 10 to 50 nucleotides. For example, a primer may have a length of 10 to 40, 10 to 30, 10 to 20, 25 to 50, 15 to 40, 15 to 30, 20 to 50, 20 to 40, or 20 to 30 nucleotides. In some embodiments, a primer has a length of 18 to 24 nucleotides. Examples of primers include, but are not limited to, P5 primer, P7 primer, PE1 primer, PE2 primer, A19 primer, or other primers discussed herein.

In some cases, the oligonucleotide may contain nonsense or random sequences, e.g., to increase the mass or size of the oligonucleotide. The random sequence can be of any suitable length, and there may be one or more than one present. As non-limiting examples, the random sequence may have a length of 10 to 40, 10 to 30, 10 to 20, 25 to 50, 15 to 40, 15 to 30, 20 to 50, 20 to 40, or 20 to 30 nucleotides.

Other sequences may also be present as well, e.g., primers such as PE-1, or a gene-specific inner forward primer or a gene-specific reverse primer sequence, or other sequences as discussed herein. Additional examples of primers include, but are not limited to, P5 primer, P7 primer, PE1 primer, PE2 primer, A19 primer, or other primers discussed herein. These may be useful, for example, to promote amplification of the nucleic acid, or for other applications. In addition, as mentioned, the oligonucleotides may also contain a cleavable sequence or linker, or otherwise be releasable from the particles.

In some cases, the oligonucleotide may comprise one or more sequences able to specifically bind a gene or other entity. For example, in one set of embodiments, the oligonucleotide may comprise a sequence able to recognize mRNA, e.g., one containing a poly-T sequence (e.g., having several T's in a row, e.g., 4, 5, 6, 7, 8, or more T's).

In one set of embodiments, the oligonucleotide may contain one or more cleavable linkers, e.g., that can be cleaved upon application of a suitable stimulus. For example, the cleavable sequence may be a photocleavable linker that can be cleaved by applying light or a suitable chemical or enzyme. A non-limiting example of a photocleavable linker can be seen in FIG. 4. In some cases, for example, a plurality of particles (containing oligonucleotides on their surfaces) may be prepared and added to droplets, e.g., such that, on average, each droplet contains one particle, or less (or more) in some cases. After being added to the droplet, the oligonucleotides may be cleaved from the particles, e.g., using light or other suitable cleavage techniques, to allow the oligonucleotides to become present in solution, i.e., within the interior of the droplet. In such fashion, oligonucleotides can be easily loaded into droplets by loading of the particles into the droplets, then cleaved off to allow the oligonucleotides to be in solution, e.g., to interact with nucleotides or other species, such as is discussed herein.

A variety of techniques may be used for preparing oligonucleotides such as those discussed herein. These may be prepared in bulk and/or in one or more droplets, such as microfluidic droplets. In some cases, the oligonucleotides may be prepared in droplets, e.g., to ensure that the barcodes and/or oligonucleotides within each droplet are unique. In addition, in some embodiments, particles may be prepared containing oligonucleotides with various barcodes in separate droplets, and the particles may then be given or sold to a user who then adds the nucleic acids to the oligonucleotides, e.g., as described above.

In some cases, an oligonucleotide comprising DNA and/or other nucleic acids may be attached to particles and delivered to the droplets. In some cases, the oligonucleotides are attached to particles to control their delivery into droplets, e.g., such that a droplet will typically have at most one particle in it. In some cases, upon delivery into a droplet, the oligonucleotide may be removed from the particle, e.g., by cleavage, by degrading the particle, etc. However, it should be understood that in other embodiments, a droplet may contain 2, 3, or any other number of particles, which may have oligonucleotides that are the same or different.

The oligonucleotide may be attached to a particle, e.g., as discussed herein. In some embodiments, a particle may comprise only one oligonucleotide, although multiple copies of the oligonucleotide may be present on the particle; other particles may comprise different oligonucleotides that are distinguishable, e.g., using the barcode sequences described herein.

Any suitable method may be used to attach the oligonucleotide to the particle. The exact method of attachment is not critical, and may be, for instance, chemical or physical. For example, the oligonucleotide may be covalently bonded to the particle via a biotin-steptavidin linkage, an amino linkage, or an acrylic phosphoramidite linkage. See, e.g., FIG. 6 for an example of an acrylic phosphoramidite linkage. In another set of embodiments, the oligonucleotide may be incorporated into the particle, e.g., physically, where the oligonucleotide may be released by altering the particle. Thus, in some cases, the oligonucleotide need not have a cleavable linkage. For instance, in one set of embodiments, an oligonucleotide may be incorporated into particle, such as an agarose particle, upon formation of the particle. Upon degradation of the particle (for example, by heating the particle until it begins to soften, degrade, or liquefy), the oligonucleotide may be released from the particle.

The particle is a microparticle in certain aspects of the invention. The particle may be of any of a wide variety of types; as discussed, the particle may be used to introduce a particular oligonucleotide into a droplet, and any suitable particle to which oligonucleotides can associate with (e.g., physically or chemically) may be used. The exact form of the particle is not critical. The particle may be spherical or non-spherical, and may be formed of any suitable material. In some cases, a plurality of particles is used, which have substantially the same composition and/or substantially the same average diameter. The "average diameter" of a plurality or series of particles is the arithmetic average of the average diameters of each of the particles. Those of ordinary skill in the art will be able to determine the average diameter (or other characteristic dimension) of a plurality or series of particles, for example, using laser light scattering, microscopic examination, or other known techniques. The average diameter of a single particle, in a non-spherical particle, is the diameter of a perfect sphere having the same volume as the non-spherical particle. The average diameter of a particle (and/or of a plurality or series of particles) may be, for example, less than about 1 mm, less than about 500 micrometers, less than about 200 micrometers, less than about 100 micrometers, less than about 75 micrometers, less than about 50 micrometers, less than about 25 micrometers, less than about 10 micrometers, or less than about 5 micrometers in some cases. The average diameter may also be at least about 1 micrometer, at least about 2 micrometers, at least about 3 micrometers, at least about 5 micrometers, at least about 10 micrometers, at least about 15 micrometers, or at least about 20 micrometers in certain cases.

The particle may be, in one set of embodiments, a hydrogel particle. See, e.g., Int. Pat. Apl. Pub. No. WO 2008/109176, entitled "Assay and other reactions involving droplets" (incorporated herein by reference) for examples of hydrogel particles, including hydrogel particles containing DNA. Examples of hydrogels include, but are not limited to agarose or acrylamide-based gels, such as polyacrylamide, poly-N-isopropylacrylamide, or poly N-isopropylpolyacrylamide. For example, an aqueous solution of a monomer may be dispersed in a droplet, and then polymerized, e.g., to form a gel. Another example is a hydrogel, such as alginic acid that can be gelled by the addition of calcium ions. In some cases, gelation initiators (ammonium persulfate and TEMED for acrylamide, or $Ca^{2+}$ for alginate) can be added to a droplet, for example, by co-flow with the aqueous phase, by co-flow through the oil phase, or by coalescence of two different drops, e.g., as discussed in U.S. patent application Ser. No. 11/360,845, filed Feb. 23, 2006, entitled "Electronic Control of Fluidic Species," by Link, et al., published as U.S. Patent Application Publication No. 2007/000342 on Jan. 4, 2007; or in U.S. patent application Ser. No. 11/698, 298, filed Jan. 24, 2007, entitled "Fluidic Droplet Coalescence," by Ahn, et al.; each incorporated herein by reference in their entireties.

In another set of embodiments, the particles may comprise one or more polymers. Exemplary polymers include, but are not limited to, polystyrene (PS), polycaprolactone (PCL), polyisoprene (PIP), poly(lactic acid), polyethylene, polypropylene, polyacrylonitrile, polyimide, polyamide, and/or mixtures and/or co-polymers of these and/or other polymers. In addition, in some cases, the particles may be magnetic, which could allow for the magnetic manipulation of the particles. For example, the particles may comprise iron or other magnetic materials. The particles could also be functionalized so that they could have other molecules attached, such as proteins, nucleic acids or small molecules. Thus, some embodiments of the present invention are directed to a set of particles defining a library of, for example, nucleic acids, proteins, small molecules, or other species such as those described herein. In some embodiments, the particle may be fluorescent.

In some aspects, particles such as those discussed herein containing oligonucleotides may be contained within a droplet and the oligonucleotides released from the particle into the interior of the droplet. The droplet may also contain nucleic acid (e.g., produced by lysing a cell), which can be bound to or recognized by the oligonucleotides. The particles and the cells may be introduced within the droplets during and/or after formation of the droplets, and may be added simultaneously or sequentially (in any suitable order). As mentioned, in some embodiments, the particles and the cells may be placed within droplets such that the droplets typically would contain, on average, no more than one particle and no more than one cell. In addition, in some cases, the droplet may be caused to form a gel, e.g., encapsulating the cell and/or particle (which may also be a gel, as noted above).

In one set of embodiments, droplets are formed containing a cell or other source of nucleic acid, and a particle, e.g., comprising an oligonucleotide as described above. Any suitable method may be chosen to create droplets, and a wide variety of different techniques for forming droplets will be known to those of ordinary skill in the art. For example, a junction of channels may be used to create the droplets. The junction may be, for instance, a T-junction, a Y-junction, a channel-within-a-channel junction (e.g., in a coaxial arrangement, or comprising an inner channel and an outer channel surrounding at least a portion of the inner channel), a cross (or "X") junction, a flow-focusing junction, or any other suitable junction for creating droplets. See, for example, International Patent Application No. PCT/US2004/010903, filed Apr. 9, 2004, entitled "Formation and Control of Fluidic Species," by Link, et al., published as WO 2004/091763 on Oct. 28, 2004, or International Patent Application No. PCT/US2003/020542, filed Jun. 30, 2003, entitled "Method and Apparatus for Fluid Dispersion," by Stone, et al., published as WO 2004/002627 on Jan. 8, 2004, each of which is incorporated herein by reference in its entirety. In some embodiments, the junction may be configured and arranged to produce substantially monodisperse droplets. The droplets may also be created on the fluidic device, and/or the droplets may be created separately then brought to the device.

In certain cases, the gel or other particles may be contained within a fluidic droplet. The fluidic droplet may also contain other species, e.g., oligonucleotides or enzymes (such as those used to produce cDNA, cleave nucleic acids, ligation, or the like). In some cases, the fluidic droplets are microfluidic. Fluidic droplets are discussed in additional detail below. In some cases, the gel or other particles and the oligonucleotides may be encapsulated into a fluidic droplet, e.g., sequentially and/or simultaneously. The gel or other particles and the oligonucleotides may be encapsulated into a fluidic droplet at formation of the fluidic droplet, and/or after the fluidic droplet has been formed, for example, through picoinjection or other methods such as those discussed in U.S. Pat. Apl. Ser. No. 13/379,782, filed Dec. 21, 2011, entitled "Fluid Injection," published as U.S. Pat. Apl. Pub. No. 2012/0132288 on May 31, 2012, incorporated herein by reference in its entirety, through fusion of the fluidic droplets, or through other techniques known to those of ordinary skill in the art.

In some embodiments, oligonucleotides or other nucleic acids contained within the fluidic droplets may be amplified within the droplets. In some cases, oligonucleotides or other nucleic acids may be joined together and or amplified using PCR or other amplification techniques, e.g., within a fluidic droplet.

In one set of embodiments, the PCR may be performed within the fluidic droplets. For example, the droplets may contain a polymerase (such as Taq polymerase), and DNA nucleotides, and the droplets may be processed (e.g., via repeated heated and cooling) to amplify the nucleic acid within the droplets. The polymerase and nucleotides may be added to a droplet at any suitable point. Those of ordinary skill in the art will be aware of suitable PCR techniques and variations, such as assembly PCR or polymerase cycling assembly, which may be used in some embodiments to produce an amplified nucleic acid In one set of embodiments, PCR or nucleic acid amplification may be performed within the fluidic droplets. For example, the fluidic droplets may contain a polymerase (such as Taq polymerase), and DNA nucleotides, and the fluidic droplets may be processed (e.g., via repeated heated and cooling) to amplify nucleic acids or oligonucleotides within the droplets. The polymerase and nucleotides may be added at any suitable point, e.g., before, during, or after various nucleic acids encoding various conditions are added to the fluidic droplets. For instance, a droplet may contain polymerase and DNA nucleotides, which is fused to the fluidic droplet to allow amplification to occur. Those of ordinary skill in the art will be aware of suitable PCR techniques and variations, such as assembly PCR or polymerase cycling assembly, which may be used in some embodiments to produce an amplified nucleic acid. Non-limiting examples of such procedures are also discussed below. In addition, in some cases, suitable primers may be used to initiate polymerization, e.g., P5 and P7, or other primers known to those of ordinary skill in the art. In some embodiments, primers may be added to the droplets, or the primers may be present on one or more of the nucleic acids within the droplets. Those of ordinary skill in the art will be aware of suitable primers, many of which can be readily obtained commercially.

In some cases, the fluidic droplets may be burst, broken, or otherwise disrupted. A wide variety of methods for "breaking" droplets are available to those of ordinary skill in the art, and the exact method chosen is not critical. For example, droplets contained in a carrying fluid may be disrupted using techniques such as mechanical disruption or ultrasound.

Nucleic acids (labeled with oligonucleotide tags) from different droplets may then be pooled or combined together or analyzed, e.g., sequenced, amplified, etc. The nucleic acids from different droplets, may however, remain distinguishable due to the presence of different oligonucleotide tags (e.g., containing different barcodes) that were present in each droplet prior to disruption.

In certain embodiments, after attaching oligonucleotides (e.g., containing barcodes), the nucleic acids from different droplets may be pooled together for subsequent analysis, e.g., by sequencing, such as high-throughput sequencing. In some cases, the droplets may be burst to release the nucleic acids.

For example, the nucleic acids may be sequenced using a variety of techniques and instruments, many of which are readily available commercially. Examples of such techniques include, but are not limited to, chain-termination sequencing, sequencing-by-hybridization, Maxam-Gilbert sequencing, dye-terminator sequencing, chain-termination methods, Massively Parallel Signature Sequencing (Lynx Therapeutics), polony sequencing, pyrosequencing, sequencing by ligation, ion semiconductor sequencing, DNA nanoball sequencing, single-molecule real-time sequencing, nanopore sequencing, microfluidic Sanger sequencing, digital RNA sequencing ("digital RNA-seq"), etc. The exact sequencing method chosen is not critical.

In addition, in some cases, the droplets may also contain one or more DNA-tagged antibodies, e.g., to determine proteins in the cell, e.g., by suitable tagging with DNA. Thus, for example, a protein may be detected in a plurality of cells as discussed herein, using DNA-tagged antibodies specific for the protein.

Additional details regarding systems and methods for manipulating droplets in a microfluidic system in accordance with various aspects of the invention follow, e.g., for determining droplets (or species within droplets), sorting droplets, etc. For example, various systems and methods for screening and/or sorting droplets are described in U.S. patent application Ser. No. 11/360,845, filed Feb. 23, 2006, entitled "Electronic Control of Fluidic Species," by Link, et al., published as U.S. Patent Application Publication No. 2007/000342 on Jan. 4, 2007, incorporated herein by reference. As a non-limiting example, by applying (or removing) a first electric field (or a portion thereof), a droplet may be directed to a first region or channel; by applying (or removing) a second electric field to the device (or a portion thereof), the droplet may be directed to a second region or channel; by applying a third electric field to the device (or a portion thereof), the droplet may be directed to a third region or channel; etc., where the electric fields may differ in some way, for example, in intensity, direction, frequency, duration, etc.

In certain embodiments of the invention, sensors are provided that can sense and/or determine one or more characteristics of the fluidic droplets, and/or a characteristic of a portion of the fluidic system containing the fluidic droplet (e.g., the liquid surrounding the fluidic droplet) in such a manner as to allow the determination of one or more characteristics of the fluidic droplets. Characteristics determinable with respect to the droplet and usable in the invention can be identified by those of ordinary skill in the art. Non-limiting examples of such characteristics include fluorescence, spectroscopy (e.g., optical, infrared, ultraviolet, etc.), radioactivity, mass, volume, density, temperature, viscosity, pH, concentration of a substance, such as a biological substance (e.g., a protein, a nucleic acid, etc.), or the like.

In some cases, the sensor may be connected to a processor, which in turn, cause an operation to be performed on the fluidic droplet, for example, by sorting the droplet, adding or removing electric charge from the droplet, fusing the droplet with another droplet, splitting the droplet, causing mixing to occur within the droplet, etc., for example, as previously described. For instance, in response to a sensor measurement of a fluidic droplet, a processor may cause the fluidic droplet to be split, merged with a second fluidic droplet, etc.

One or more sensors and/or processors may be positioned to be in sensing communication with the fluidic droplet. "Sensing communication," as used herein, means that the sensor may be positioned anywhere such that the fluidic droplet within the fluidic system (e.g., within a channel), and/or a portion of the fluidic system containing the fluidic droplet may be sensed and/or determined in some fashion. For example, the sensor may be in sensing communication with the fluidic droplet and/or the portion of the fluidic system containing the fluidic droplet fluidly, optically or visually, thermally, pneumatically, electronically, or the like. The sensor can be positioned proximate the fluidic system, for example, embedded within or integrally connected to a wall of a channel, or positioned separately from the fluidic system but with physical, electrical, and/or optical communication with the fluidic system so as to be able to sense and/or determine the fluidic droplet and/or a portion of the fluidic system containing the fluidic droplet (e.g., a channel or a microchannel, a liquid containing the fluidic droplet, etc.). For example, a sensor may be free of any physical connection with a channel containing a droplet, but may be positioned so as to detect electromagnetic radiation arising from the droplet or the fluidic system, such as infrared, ultraviolet, or visible light. The electromagnetic radiation may be produced by the droplet, and/or may arise from other portions of the fluidic system (or externally of the fluidic system) and interact with the fluidic droplet and/or the portion of the fluidic system containing the fluidic droplet in such as a manner as to indicate one or more characteristics of the fluidic droplet, for example, through absorption, reflection, diffraction, refraction, fluorescence, phosphorescence, changes in polarity, phase changes, changes with respect to time, etc. As an example, a laser may be directed towards the fluidic droplet and/or the liquid surrounding the fluidic droplet, and the fluorescence of the fluidic droplet and/or the surrounding liquid may be determined. "Sensing communication," as used herein may also be direct or indirect. As an example, light from the fluidic droplet may be directed to a sensor, or directed first through a fiber optic system, a waveguide, etc., before being directed to a sensor.

Non-limiting examples of sensors useful in the invention include optical or electromagnetically-based systems. For example, the sensor may be a fluorescence sensor (e.g., stimulated by a laser), a microscopy system (which may include a camera or other recording device), or the like. As another example, the sensor may be an electronic sensor, e.g., a sensor able to determine an electric field or other electrical characteristic. For example, the sensor may detect capacitance, inductance, etc., of a fluidic droplet and/or the portion of the fluidic system containing the fluidic droplet.

As used herein, a "processor" or a "microprocessor" is any component or device able to receive a signal from one or more sensors, store the signal, and/or direct one or more responses (e.g., as described above), for example, by using a mathematical formula or an electronic or computational circuit. The signal may be any suitable signal indicative of the environmental factor determined by the sensor, for example a pneumatic signal, an electronic signal, an optical signal, a mechanical signal, etc.

In one set of embodiments, a fluidic droplet may be directed by creating an electric charge and/or an electric dipole on the droplet, and steering the droplet using an applied electric field, which may be an AC field, a DC field, etc. As an example, an electric field may be selectively applied and removed (or a different electric field may be applied, e.g., a reversed electric field) as needed to direct the fluidic droplet to a particular region. The electric field may be selectively applied and removed as needed, in some embodiments, without substantially altering the flow of the liquid containing the fluidic droplet. For example, a liquid may flow on a substantially steady-state basis (i.e., the average flowrate of the liquid containing the fluidic droplet deviates by less than 20% or less than 15% of the steady-state flow or the expected value of the flow of liquid with respect to time, and in some cases, the average flowrate may deviate less than 10% or less than 5%) or other predetermined basis through a fluidic system of the invention (e.g., through a channel or a microchannel), and fluidic droplets contained within the liquid may be directed to various regions, e.g., using an electric field, without substantially altering the flow of the liquid through the fluidic system.

In some embodiments, the fluidic droplets may be screened or sorted within a fluidic system of the invention by altering the flow of the liquid containing the droplets. For instance, in one set of embodiments, a fluidic droplet may be steered or sorted by directing the liquid surrounding the fluidic droplet into a first channel, a second channel, etc.

In another set of embodiments, pressure within a fluidic system, for example, within different channels or within different portions of a channel, can be controlled to direct the flow of fluidic droplets. For example, a droplet can be directed toward a channel junction including multiple options for further direction of flow (e.g., directed toward a branch, or fork, in a channel defining optional downstream flow channels). Pressure within one or more of the optional downstream flow channels can be controlled to direct the droplet selectively into one of the channels, and changes in pressure can be effected on the order of the time required for successive droplets to reach the junction, such that the downstream flow path of each successive droplet can be independently controlled. In one arrangement, the expansion and/or contraction of liquid reservoirs may be used to steer or sort a fluidic droplet into a channel, e.g., by causing directed movement of the liquid containing the fluidic droplet. The liquid reservoirs may be positioned such that, when activated, the movement of liquid caused by the activated reservoirs causes the liquid to flow in a preferred direction, carrying the fluidic droplet in that preferred direction. For instance, the expansion of a liquid reservoir may cause a flow of liquid towards the reservoir, while the contraction of a liquid reservoir may cause a flow of liquid away from the reservoir. In some cases, the expansion and/or contraction of the liquid reservoir may be combined with other flow-controlling devices and methods, e.g., as described herein. Non-limiting examples of devices able to cause the expansion and/or contraction of a liquid reservoir include pistons and piezoelectric components. In some cases, piezoelectric components may be particularly useful due to their relatively rapid response times, e.g., in response to an electrical signal. In some embodiments, the fluidic droplets may be sorted into more than two channels.

As mentioned, certain embodiments are generally directed to systems and methods for sorting fluidic droplets in a liquid, and in some cases, at relatively high rates. For example, a property of a droplet may be sensed and/or determined in some fashion (e.g., as further described herein), then the droplet may be directed towards a particular region of the device, such as a microfluidic channel, for example, for sorting purposes. In some cases, high sorting speeds may be achievable using certain systems and methods of the invention. For instance, at least about 10 droplets per second may be determined and/or sorted in some cases, and in other cases, at least about 20 droplets per second, at least about 30 droplets per second, at least about 100 droplets per second, at least about 200 droplets per second, at least about 300 droplets per second, at least about 500 droplets per second, at least about 750 droplets per second, at least about 1,000 droplets per second, at least about 1,500 droplets per second, at least about 2,000 droplets per second, at least about 3,000 droplets per second, at least about 5,000 droplets per second, at least about 7,500 droplets per second, at least about 10,000 droplets per second, at least about 15,000 droplets per second, at least about 20,000 droplets per second, at least about 30,000 droplets per second, at least about 50,000 droplets per second, at least about 75,000 droplets per second, at least about 100,000 droplets per second, at least about 150,000 droplets per second, at least about 200,000 droplets per second, at least about 300,000 droplets per second, at least about 500,000 droplets per second, at least about 750,000 droplets per second, at least about 1,000,000 droplets per second, at least about 1,500,000 droplets per second, at least about 2,000,000 or more droplets per second, or at least about 3,000,000 or more droplets per second may be determined and/or sorted.

In some aspects, a population of relatively small droplets may be used. In certain embodiments, as non-limiting examples, the average diameter of the droplets may be less than about 1 mm, less than about 500 micrometers, less than about 300 micrometers, less than about 200 micrometers, less than about 100 micrometers, less than about 75 micrometers, less than about 50 micrometers, less than about 30 micrometers, less than about 25 micrometers, less than about 20 micrometers, less than about 15 micrometers, less than about 10 micrometers, less than about 5 micrometers, less than about 3 micrometers, less than about 2 micrometers, less than about 1 micrometer, less than about 500 nm, less than about 300 nm, less than about 100 nm, or less than about 50 nm. The average diameter of the droplets may also be at least about 30 nm, at least about 50 nm, at least about 100 nm, at least about 300 nm, at least about 500 nm, at least about 1 micrometer, at least about 2 micrometers, at least about 3 micrometers, at least about 5 micrometers, at least about 10 micrometers, at least about 15 micrometers, or at least about 20 micrometers in certain cases. The "average diameter" of a population of droplets is the arithmetic average of the diameters of the droplets.

In some embodiments, the droplets may be of substantially the same shape and/or size (i.e., "monodisperse"), or of different shapes and/or sizes, depending on the particular application. In some cases, the droplets may have a homogenous distribution of cross-sectional diameters, i.e., the droplets may have a distribution of diameters such that no more than about 5%, no more than about 2%, or no more than about 1% of the droplets have a diameter less than about 90% (or less than about 95%, or less than about 99%) and/or greater than about 110% (or greater than about 105%, or greater than about 101%) of the overall average diameter of the plurality of droplets. Some techniques for producing homogenous distributions of cross-sectional diameters of droplets are disclosed in International Patent Application No. PCT/US2004/010903, filed Apr. 9, 2004, entitled "Formation and Control of Fluidic Species," by Link et al., published as WO 2004/091763 on Oct. 28, 2004, incorporated herein by reference.

Those of ordinary skill in the art will be able to determine the average diameter of a population of droplets, for example, using laser light scattering or other known techniques. The droplets so formed can be spherical, or non-spherical in certain cases. The diameter of a droplet, in a non-spherical droplet, may be taken as the diameter of a perfect mathematical sphere having the same volume as the non-spherical droplet.

In some embodiments, one or more droplets may be created within a channel by creating an electric charge on a fluid surrounded by a liquid, which may cause the fluid to separate into individual droplets within the liquid. In some embodiments, an electric field may be applied to the fluid to cause droplet formation to occur. The fluid can be present as a series of individual charged and/or electrically inducible droplets within the liquid. Electric charge may be created in the fluid within the liquid using any suitable technique, for example, by placing the fluid within an electric field (which may be AC, DC, etc.), and/or causing a reaction to occur that causes the fluid to have an electric charge.

The electric field, in some embodiments, is generated from an electric field generator, i.e., a device or system able to create an electric field that can be applied to the fluid. The electric field generator may produce an AC field (i.e., one that varies periodically with respect to time, for example, sinusoidally, sawtooth, square, etc.), a DC field (i.e., one that is constant with respect to time), a pulsed field, etc. Techniques for producing a suitable electric field (which may be AC, DC, etc.) are known to those of ordinary skill in the art. For example, in one embodiment, an electric field is produced by applying voltage across a pair of electrodes, which may be positioned proximate a channel such that at least a portion of the electric field interacts with the channel. The electrodes can be fashioned from any suitable electrode material or materials known to those of ordinary skill in the art, including, but not limited to, silver, gold, copper, carbon, platinum, copper, tungsten, tin, cadmium, nickel, indium tin oxide ("ITO"), etc., as well as combinations thereof.

In another set of embodiments, droplets of fluid can be created from a fluid surrounded by a liquid within a channel by altering the channel dimensions in a manner that is able to induce the fluid to form individual droplets. The channel may, for example, be a channel that expands relative to the direction of flow, e.g., such that the fluid does not adhere to the channel walls and forms individual droplets instead, or a channel that narrows relative to the direction of flow, e.g., such that the fluid is forced to coalesce into individual droplets. In some cases, the channel dimensions may be altered with respect to time (for example, mechanically or electromechanically, pneumatically, etc.) in such a manner as to cause the formation of individual droplets to occur. For example, the channel may be mechanically contracted ("squeezed") to cause droplet formation, or a fluid stream may be mechanically disrupted to cause droplet formation, for example, through the use of moving baffles, rotating blades, or the like. Other techniques of creating droplets include, for example mixing or vortexing of a fluid.

Certain embodiments are generally directed to systems and methods for splitting a droplet into two or more droplets. For example, a droplet can be split using an applied electric field. The droplet may have a greater electrical conductivity than the surrounding liquid, and, in some cases, the droplet may be neutrally charged. In certain embodiments, in an applied electric field, electric charge may be urged to migrate from the interior of the droplet to the surface to be distributed thereon, which may thereby cancel the electric field experienced in the interior of the droplet. In some embodiments, the electric charge on the surface of the droplet may also experience a force due to the applied electric field, which causes charges having opposite polarities to migrate in opposite directions. The charge migration may, in some cases, cause the drop to be pulled apart into two separate droplets.

Some embodiments of the invention generally relate to systems and methods for fusing or coalescing two or more droplets into one droplet, e.g., where the two or more droplets ordinarily are unable to fuse or coalesce, for example, due to composition, surface tension, droplet size, the presence or absence of surfactants, etc. In certain cases, the surface tension of the droplets, relative to the size of the droplets, may also prevent fusion or coalescence of the droplets from occurring.

As a non-limiting example, two droplets can be given opposite electric charges (i.e., positive and negative charges, not necessarily of the same magnitude), which can increase the electrical interaction of the two droplets such that fusion or coalescence of the droplets can occur due to their opposite electric charges. For instance, an electric field may be applied to the droplets, the droplets may be passed through a capacitor, a chemical reaction may cause the droplets to become charged, etc. The droplets, in some cases, may not be able to fuse even if a surfactant is applied to lower the surface tension of the droplets. However, if the droplets are electrically charged with opposite charges (which can be, but are not necessarily of, the same magnitude), the droplets may be able to fuse or coalesce. As another example, the droplets may not necessarily be given opposite electric charges (and, in some cases, may not be given any electric charge), and are fused through the use of dipoles induced in the droplets that causes the droplets to coalesce. Also, the two or more droplets allowed to coalesce are not necessarily required to meet "head-on." Any angle of contact, so long as at least some fusion of the droplets initially occurs, is sufficient. See also, e.g., U.S. patent application Ser. No. 11/698,298, filed Jan. 24, 2007, entitled "Fluidic Droplet Coalescence," by Ahn, et al., published as U.S. Patent Application Publication No. 2007/0195127 on Aug. 23, 2007, incorporated herein by reference in its entirety.

In one set of embodiments, a fluid may be injected into a droplet. The fluid may be microinjected into the droplet in some cases, e.g., using a microneedle or other such device. In other cases, the fluid may be injected directly into a droplet using a fluidic channel as the droplet comes into contact with the fluidic channel. Other techniques of fluid injection are disclosed in, e.g., International Patent Application No. PCT/US2010/040006, filed Jun. 25, 2010, entitled "Fluid Injection," by Weitz, et al., published as WO 2010/151776 on Dec. 29, 2010; or International Patent Application No. PCT/US2009/006649, filed Dec. 18, 2009, entitled "Particle-Assisted Nucleic Acid Sequencing," by Weitz, et al., published as WO 2010/080134 on Jul. 15, 2010, each incorporated herein by reference in its entirety.

A variety of materials and methods, according to certain aspects of the invention, can be used to form articles or components such as those described herein, e.g., channels such as microfluidic channels, chambers, etc. For example, various articles or components can be formed from solid materials, in which the channels can be formed via micromachining, film deposition processes such as spin coating and chemical vapor deposition, laser fabrication, photolithographic techniques, etching methods including wet chemical or plasma processes, and the like. See, for example, *Scientific American,* 248:44-55, 1983 (Angell, et al).

In one set of embodiments, various structures or components of the articles described herein can be formed of a polymer, for example, an elastomeric polymer such as polydimethylsiloxane ("PDMS"), polytetrafluoroethylene ("PTFE" or Teflon®), or the like. For instance, according to one embodiment, a microfluidic channel may be implemented by fabricating the fluidic system separately using PDMS or other soft lithography techniques (details of soft lithography techniques suitable for this embodiment are discussed in the references entitled "Soft Lithography," by Younan Xia and George M. Whitesides, published in the *Annual Review of Material Science*, 1998, Vol. 28, pages 153-184, and "Soft Lithography in Biology and Biochemistry," by George M. Whitesides, Emanuele Ostuni, Shuichi Takayama, Xingyu Jiang and Donald E. Ingber, published in the *Annual Review of Biomedical Engineering*, 2001, Vol. 3, pages 335-373; each of these references is incorporated herein by reference).

Other examples of potentially suitable polymers include, but are not limited to, polyethylene terephthalate (PET), polyacrylate, polymethacrylate, polycarbonate, polystyrene, polyethylene, polypropylene, polyvinylchloride, cyclic olefin copolymer (COC), polytetrafluoroethylene, a fluorinated polymer, a silicone such as polydimethylsiloxane, polyvinylidene chloride, bis-benzocyclobutene ("BCB"), a polyimide, a fluorinated derivative of a polyimide, or the like. Combinations, copolymers, or blends involving polymers including those described above are also envisioned. The device may also be formed from composite materials, for example, a composite of a polymer and a semiconductor material.

In some embodiments, various structures or components of the article are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a "prepolymer"). Suitable polymeric liquids can include, for example, thermoplastic polymers, thermoset polymers, waxes, metals, or mixtures or composites thereof heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, dodecyltrichlorosilanes, etc.

Silicone polymers are used in certain embodiments, for example, the silicone elastomer polydimethylsiloxane. Non-limiting examples of PDMS polymers include those sold under the trademark Sylgard by Dow Chemical Co., Midland, MI, and particularly Sylgard 182, Sylgard 184, and Sylgard 186. Silicone polymers including PDMS have several beneficial properties simplifying fabrication of various structures of the invention. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 75° C. for exposure times of, for example, about an hour. Also, silicone polymers, such as PDMS, can be elastomeric and thus may be useful for forming very small features with relatively high aspect ratios, necessary in certain embodiments of the invention. Flexible (e.g., elastomeric) molds or masters can be advantageous in this regard.

One advantage of forming structures such as microfluidic structures or channels from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, structures can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in the art, for example, in an article entitled "Rapid Prototyping of Microfluidic Systems and Polydimethylsiloxane," *Anal. Chem.*, 70:474-480, 1998 (Duffy et al.), incorporated herein by reference.

Thus, in certain embodiments, the design and/or fabrication of the article may be relatively simple, e.g., by using relatively well-known soft lithography and other techniques such as those described herein. In addition, in some embodiments, rapid and/or customized design of the article is possible, for example, in terms of geometry. In one set of embodiments, the article may be produced to be disposable, for example, in embodiments where the article is used with substances that are radioactive, toxic, poisonous, reactive, biohazardous, etc., and/or where the profile of the substance (e.g., the toxicology profile, the radioactivity profile, etc.) is unknown. Another advantage to forming channels or other structures (or interior, fluid-contacting surfaces) from oxidized silicone polymers is that these surfaces can be much more hydrophilic than the surfaces of typical elastomeric polymers (where a hydrophilic interior surface is desired). Such hydrophilic channel surfaces can thus be more easily filled and wetted with aqueous solutions than can structures comprised of typical, unoxidized elastomeric polymers or other hydrophobic materials.

The following documents are each incorporated herein by reference in its entirety for all purposes: U.S. Pat. Apl. Ser. No. 61/980,541, entitled "Methods and Systems for Droplet Tagging and Amplification," by Weitz, et al.; U.S. Pat. Apl. Ser. No. 61/981,123, entitled "Systems and Methods for Droplet Tagging," by Bernstein, et al.; Int. Pat. Apl. Pub. No. WO 2004/091763, entitled "Formation and Control of Fluidic Species," by Link et al.; Int. Pat. Apl. Pub. No. WO 2004/002627, entitled "Method and Apparatus for Fluid Dispersion," by Stone et al.; Int. Pat. Apl. Pub. No. WO 2006/096571, entitled "Method and Apparatus for Forming Multiple Emulsions," by Weitz et al.; Int. Pat. Apl. Pub. No. WO 2005/021151, entitled "Electronic Control of Fluidic Species," by Link et al.; Int. Pat. Apl. Pub. No. WO 2011/056546, entitled "Droplet Creation Techniques," by Weitz, et al.; Int. Pat. Apl. Pub. No. WO 2010/033200, entitled "Creation of Libraries of Droplets and Related Species," by Weitz, et al.; U.S. Pat. Apl. Pub. No. 2012-0132288, entitled "Fluid Injection," by Weitz, et al.; Int. Pat. Apl. Pub. No. WO 2008/109176, entitled "Assay And Other Reactions Involving Droplets," by Agresti, et al.; and Int. Pat. Apl. Pub. No. WO 2010/151776, entitled "Fluid Injection," by Weitz, et al.; and U.S. Pat. Apl. Ser. No. 62/072,944, entitled "Systems and Methods for Barcoding Nucleic Acids," by Weitz, et al.

In addition, the following are incorporated herein by reference in their entireties: U.S. Pat. Apl. Ser. No. 61/981,123 filed Apr. 17, 2014; Int. Pat. Apl. Ser. No. PCT/US15/026338, filed Apr. 17, 2015, entitled "Systems and Methods for Droplet Tagging"; U.S. Pat. Apl. Ser. No. 61/981,108 filed Apr. 17, 2014; Int. Pat. Apl. Ser. No. PCT/US15/26422, filed on Apr. 17, 2015, entitled "Methods and Systems for Droplet Tagging and Amplification"; Int. Pat. Apl. Ser. No. PCT/US16/027734, filed on Apr. 15, 2016, entitled "Barcoding Systems and Methods for Gene Sequencing and Other Applications"; U.S. Pat. Apl. Ser. No. 62/072,944, filed Oct. 30, 2014; and Int. Pat. Apl. Ser. No. PCT/US15/26443, filed on Apr. 17, 2015, entitled "Systems and Methods for Barcoding Nucleic Acids." Also incorporated herein by reference in its entirety is U.S. Provisional Patent Application Ser. No. 62/324,407, filed Apr. 19, 2016, entitled "Immobilization-Based Systems and Methods for Genetic Analysis and Other Applications," by Weitz, et al.

The following examples are intended to illustrate certain embodiments of the present invention, but do not exemplify the full scope of the invention.

Example 1

This example shows a high-throughput and cost-effective method for the simultaneous analysis of RNA and DNA from single cells. Single cells are first co-encapsulated with lysis buffer into a liquid, low-melting temperature agarose using a microfluidics drop maker, and the cells are immobilized within a gel by cooling the agarose to form a solid (or gel) phase, e.g., gel particles. In the agarose gel, a linear polymer conjugated to either oligo d(T) or gene specific primers is added to capture cellular RNAs, followed by reverse transcription (RT) to copy the mRNA information onto agarose gel particles. To achieve the genomic DNA information, genomic DNA (gDNA) is treated and further encapsulation and amplification is performed within the gel drops. Since the pore size of agarose gel particles is relatively small, gene fragments from a single cell may be kept in the same agarose gel particle during various treatments. Meanwhile, a large size of monoclonal DNA-based barcoding beads library is prepared; there are about $10^8$ same barcoding sequences on each bead. The barcoding beads are merged with the drops containing products from cellular RNA and DNA, and ligated with the barcodes on the beads, thereby generating a library of barcoding beads containing all the gene information from a single cell. Next-gene sequencing may then be utilized to obtain the information from, e.g., thousands of single cells.

1. Fabrication of microfluidics devices. Polydimethylsiloxane (PDMS) microfluidic devices were fabricated using standard soft lithographic methods. The microfluidic channel walls were rendered hydrophobic by treating them with Aquapel. In the PDMS device for the pico-injection experiment, electrodes were designed as channels. These channels were filled with Indalloy 19 (51 In, 32.5 Bi, 16.5 Sn; 0.020 inch diameter), a low melting point metal alloy, by pushing the wire into the punched holes on an 80° C. hot plate. Electrical connections were made using eight-pin terminal blocks. See, e.g., Int. Pat. Apl. Pub. Nos. WO 2004/091763, WO 2004/002627, WO 2005/021151, or WO 2010/151776, each incorporated herein by reference in its entirety.

2. Synthesis of monoclonal barcoded beads. The full length of barcode sequence is 5'-/5Acryd/iSpPC/-PE1 illumina adapter-barcode 1-linker sequence-barcode 2-universal sequence ending with T-3'. To synthesize the monoclonal barcoded beads, the protocol described in U.S. Pat. Apl. Ser. No. 62/072,944 (incorporated herein by reference in its entirety) was used with an additional hybridization step. Briefly, a microfluidics drop maker was used to encapsulate acrylamide:bis-acrylamide solution, acrydite-modified DNA primer and ammonium persulfate into micron-sized water-in-oil drops. To catalyze acrylamide polymerization, TEMED was added in the continuous oil phase. The generated drops were then incubated at 65° C. for overnight, and then the oil washed away. In the resulting acrylamide gel beads, there were millions of incorporated 5'-/5Acryd/iSpPC/-PE1 Illumina adapters.

In the next step, the combinatorial barcode-1 and barcode-2 were sequentially synthesized onto the gel beads by extension and split-pool method. Finally, DNA fragments were hybridized with the complementary sequence to the universal sequence to form a partial double-stranded DNA with an overhanging T at the 3' end.

3. Simultaneous Target RNA (Small Number) and Genomic DNA Sequencing (See FIG. 1)

3.1. Co-encapsulate cells with lysis buffer and target RNA capture oligonucleotides:Acrydited target RNA capture oligonucleotides were grafted onto linear polyacrylamide (LPA) by copolymerization with acrylamide. A total of 10 microliters of 1 mM acrydited target RNA capture oligonucleotides was mixed with 10 microliters of 40% acrylamide in 80 microliters of DI water. Then, 1.4 microliters of 10% APS and 1.4 microliters of 10% TEMED were added in the solution. The solution is immediately mixed well and kept in a vacuum to remove air and the polymerization reaction took about 12 min to complete.

Cell lysis cocktail solution was prepared with the following final concentrations: 20 mM Tris-HCl, 4% Tween 20, 1 mg/mL Proteinase K and 1% low melting temperature agarose gel. The cells were mixed with 2% low melting temperature agarose gel at a 1:1 ratio. In the agarose gel, 2 micromolar target RNA capture oligonucleotides on LPA were used. To avoid amplification of genomic DNA, reverse and forward primers were designed to span two adjacent exons of RNA. The cell-agarose solution and lysis buffer was injected into two inlets of a co-encapsulation drop maker. The generated drops were collected on ice and subsequently incubated at 37° C. for 10 min and 50° C. for 30 min to lyse cells. To capture the target RNAs, the temperature was decreased to 25° C. at 0.1° C./min, and then the drops were put on ice to solidify the agarose gel.

3.2 Break emulsion and RT to generate first-strand cDNA: To break the emulsion, 1H,1H,2H,2H-perfluoro-1-octanol (PFO) was added to the emulsion and centrifuged to collect the agarose gel particles. The gel particles were washed twice with 10 mM Tris-HCl and mixed with 2× SuperScript II reverse transcriptase cocktail at a 1:1 ratio. The 2×SuperScript II reverse transcriptase cocktail was prepared with the following final concentrations: 2×RT buffer, 20 mM DTT, 4 units/microliters RNasin and 20 units/microliters SuperScript II reverse transcriptase. The mixture was incubated at 42° C. for 40 min, followed by gel washing twice with 10 mM Tris-HCl.

3.3 Digest RNA: RNase H was used to digest the RNA molecules on the hybrid of RNA and first-strand cDNA.

3.4 Digest double-stranded genomic DNA (dsgDNA): Using NEBNext® dsDNA Fragmentase®, the genomic DNA was digested to yield around 300-bp DNA fragments. The 20 microliters reaction solution contained 1× reaction buffer, 2 microliters fragmentase and 10 microliters agarose gel particles containing cells. These were incubated at 37° C. for 30 min and then 5 microliters of 0.5M EDTA was added to stop the digestion reaction.

3.5. Add a universal adapter on one side: The resulting beads performed end repair and dA tailing, and then ligated with universal adapters which are made by annealing the Miseq common oligonucleotide.

3.6 Re-emulsify the gel particles and amplify: Using a re-emulsification microfluidics device, the gel particles were re-encapsulated with a PCR mixture. Using this scheme, hundreds of gDNA genes could be amplified with forward primers and universal adapter sequences, and small amount of cDNA (<5) with gene-specific forward and reverse primers.

3.7 Label amplicons with barcoded gel beads: To label amplicons in each drop with barcoded gel beads, the thermocycled drops were flowed to a microfluidic pico-injection device and the barcoded gel beads injected to the drop by electro-coalescence. Drops were spaced on chip by oil with 1% w/w surfactant. The device electrodes were connected to a high voltage TREK 2210 amplifier which supplied a 100 V sine wave at a frequency of 25 kHz. The flow rates used to inject the drops were chosen to ensure that one barcode drop fuses with a barcoded gel beads at a 1:1 ratio. Typical flow rates fulfilling these requirements were 150 microliters/hr for the oil, 40 microliters/hr for thermocycled drops and 40 microliters/hr for the barcoded gel beads. In the solution of barcoded gel beads, T4 DNA ligase and 2× ligation buffer was added. The drops were collected and incubated at 16° C. for overnight to perform ligation.

3.8. Breaking the thermocycled drops: During ligation, the barcode sequences on the gel beads in each merged drop were ligated with the amplicon from a single template. Thus the emulsion could be broken without losing the information regarding the gDNA associated with every barcoded fragment. To break the emulsion drops in each tube for sequencing, PFO was added to the emulsion and gently centrifuged to separate the phases. PCR products were in the liquid phase.

3.9. Library preparation and 2ndGS: The PCR products were cleaned using AMPure XP Beads (Life Technologies, Grand Island, NY) and eluted into 10 microliters of 0.1M Tris-HCl. To add the full-length adapter for Miseq sequencing, the purified PCR products were amplified with the full-length primer pairs in 25 microliters of PCR cocktail. The cocktail contained 0.2 microliters of KAPA2G Fast DNA Polymerase, 1×KAPA2G buffer, 0.4 mM dNTPs, 1 microliters of forward and reverse primers and 2 microliters of ligation products. The thermocycling condition was 95° C. for 2 min, 10 cycles of 95° C. for 15 s, 56° C. for 15 s, and 72° C. for 2 s, followed by 72° C. for 5 min. The PCR products were cleaned again using beads and quantified using Qubit. The concentration was then adjusted and the sequence sampled using MiSeq system.

Example 2

This example shows simultaneous target RNA (large number) and genomic DNA sequencing. See FIG. 2.

4.1. Co-encapsulate cells and lysis buffer and capture the whole transcriptome: Acrydited oligo dT was grafted onto LPA by copolymerization with acrylamide. The embedding method was the same as section 3.1.

4.2. Break emulsion and RT to generate first-strand cDNA: The emulsions were broken and centrifuged to collect the agarose gel particles. The gel particles are washed and mixed with 2× SuperScript II reverse transcriptase cocktail at a 1:1 ratio, followed by incubating at 42° C. for 40 min. During Superscript II reverse transcription, non-templated three A bases were added to the 3' end of the cDNA.

4.3. Digest RNA: Same as section 3.3.

4.4. Digest dsgDNA: Same as section 3.4.

4.5. Add a universal adapter on one side of the dsgDNA and sscDNA: The same method
as described in section 3.5 was used to add a universal adapter on one side of the dsgDNA. To add a universal adapter on one side of sscDNA, another adapter with three T's overhanging was created, which can pair with the three A on the 3' end of the first-strand cDNA. This adapter also included a UMI sequence for calculation of expression level.

4.6. Re-emulsify the gel particle and amplify: Using this scheme, hundreds of gDNA genes with forward primers and universal adapter sequences, and hundreds of cDNA with forward primers and their universal adapter sequences could be amplified.

4.7-4.9. Same as section 3.7-3.9.

Example 3

This example shows co-encapsulate cells and lysis buffer and capture the whole transcriptome. See FIG. 3.

5.1. Acrydited oligo dT was grafted onto LPA by copolymerization with acrylamide. The embedding method was the same as section 3.1. Upstream of Oligo dT, a ligation sequence (LS) was added.

5.2. Break emulsion and RT to generate first-strand cDNA: Same as section 4.2.

5.3. Digest RNA: Same as section 3.3.

5.5. Digest genomic DNA, ligate with a sequencing adapter on one end: Same as section 3.4.

5.6. Re-emulsify the gel particles and amplify: Using a re-emulsification microfluidics device, the gel particles were re-encapsulated with a PCR mixture. In this PCR mixture, gene-specific forward and different universal primers for the amplification of target gDNA were added.

5.7. Label amplicons with barcoded gel beads: (1) Ligate amplicons from gDNA with barcoded gel beads. Same at section 3.7. (2) Ligate first-strand cDNA with barcoded gel beads. These were incubated to ligate the ligation sequence (LS) on the cDNA to the corresponding complementary sequence (CS) annealed to the barcoding DNA sequence.

5.8. Next steps included breaking the thermocycled drops, and adding reverse transcription enzyme mix and an oligo with sequence: 3'-TTT-PE2-T7 RNApol binding site. The oligonucleotide will pair to the non-templated A bases added to the 3' end of the cDNA during Superscript II reverse transcription and the reverse transcriptase will extend from the final non-templated A base to append the oligo complement. T7 amplification of mRNA and RT, PCR amplification of both gDNA and mRNA were performed.

5.9. Library preparation and 2ndGS: Same as section 3.9.

Example 4

In this example, cells were first encapsulated into a droplet containing agarose, and the droplet solidified to form a gel particle by exposure to ice. Then, whole genome amplification (WGA) was performed using multiple displacement amplification. To demonstrate the success of amplification, the gel particles were stained with propidium iodide (PI). Compared with the samples not exposed to WGA, highly dense staining was observed at the places where cells were present. See FIG. 8.

Figure 8:
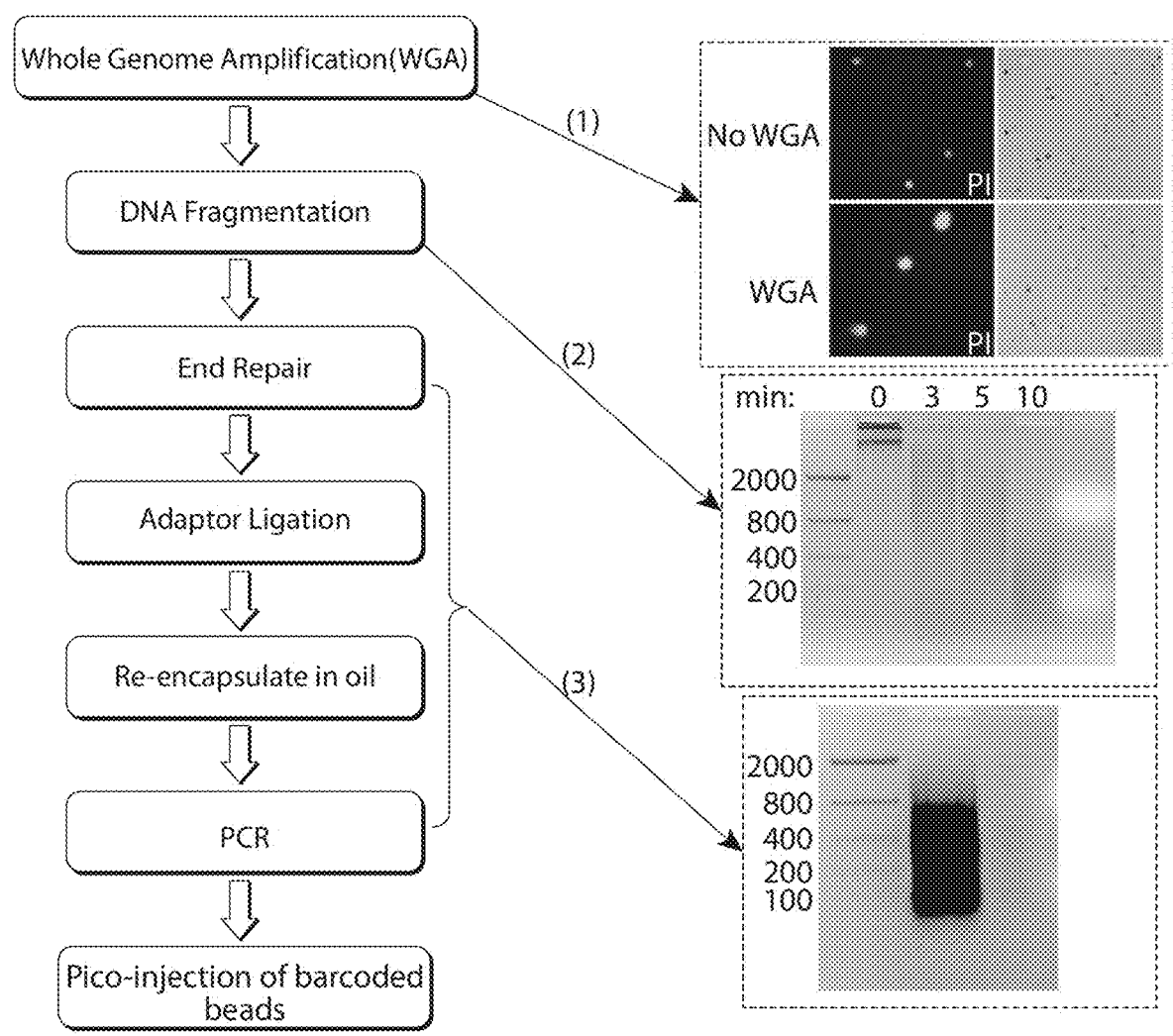
FIG. 8 illustrates an experiment for analyzing encapsulated cells, in still another embodiment of the invention.

After being digested for 10 min, the WGA products were in the range of 200-400 bp, which was useful for the following procedure for amplification. The gel particles went through end repair and adaptor ligation, and then were encapsulated into droplets again, followed by in-drop PCR. Strong amplification was observed, as can be seen in FIG. 8.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of simultaneous preparing mRNA and gDNA from a cell, comprising:
   lysing cells within gel droplets to release gDNA and mRNA from the cells;
   fragmenting the gDNA after release from the cells;
   attaching the gDNA to a first set of oligonucleotides comprising a first set of barcode sequences within the gel droplets;
   forming cDNA from the mRNA; and
   attaching the cDNA to a second set of oligonucleotides comprising a second set of barcode sequences within the gel droplets,
   wherein the first and second sets of oligonucleotides are different.

2. The method of claim 1, wherein at least some of the gel droplets comprise agarose.

3. The method of claim 1, wherein the cells are contained within the gel droplets at no more than about 1 cell/droplet.

4. The method of claim 1, wherein the gel droplets have an average diameter of no more than about 1 mm.

5. The method of claim 1, wherein at least some of the gel droplets are contained within a microfluidic channel.

6. The method of claim 1, wherein fragmenting the gDNA comprises exposing the gDNA to a restriction endonuclease.

7. The method of claim 1, further comprising forming cDNA from the mRNA using a reverse transcriptase.

8. The method of claim 1, wherein attaching the gDNA to the first set of oligonucleotides comprises ligating at least some of the gDNA to the first set of oligonucleotides.

9. The method of claim 1, wherein attaching the cDNA to the second set of oligonucleotides comprises ligating at least some of the cDNA to the second set of oligonucleotides.

10. The method of claim 1, wherein the first set of barcode sequences and the second set of barcode sequences have at least one barcode sequence of at least 5 nt in common.

11. The method of claim 1, wherein the first set of oligonucleotides is attached to particles within the gel droplets.

12. The method of claim 11, wherein the second set of oligonucleotides is attached to the particles within the gel droplets.

13. The method of claim 11, wherein at least some of the particles comprise hydrogel particles.

14. The method of claim 11, wherein the particles have an average diameter of no more than about 1 mm.

15. The method of claim 11, wherein at least some oligonucleotides of the first set of oligonucleotides are covalently bonded to the particles.

16. The method of claim 11, further comprising amplifying at least some oligonucleotides of the first set of oligonucleotides and/or the second set of oligonucleotides.

17. The method of claim 16, further comprising encapsulating at least some of the gel droplets within a fluidic droplet prior to amplifying the oligonucleotides.

18. The method of claim 16, further comprising releasing at least some oligonucleotides of the first set of oligonucleotides from the particles.

19. The method of claim 16, further comprising bursting the fluidic droplet after amplifying the oligonucleotides.

20. The method of claim 16, further comprising sequencing at least some oligonucleotides of the first set of oligonucleotides and/or the second set of oligonucleotides.

* * * * *

SEQUENCE LISTING

```
Sequence total quantity: 13
SEQ ID NO: 1                    moltype = DNA  length = 31
FEATURE                         Location/Qualifiers
source                          1..31
                                mol_type = other DNA
                                organism = synthetic construct
SEQUENCE: 1
ccatctcatc cctgcgtgtc tccgactcag t                                     31

SEQ ID NO: 2                    moltype = DNA  length = 48
FEATURE                         Location/Qualifiers
source                          1..48
                                mol_type = other DNA
                                organism = synthetic construct
SEQUENCE: 2
ctgagtcgga cacgcaacag gggatagaca aggcacacag gggatagg                   48

SEQ ID NO: 3                    moltype = DNA  length = 54
FEATURE                         Location/Qualifiers
source                          1..54
                                mol_type = other DNA
                                organism = synthetic construct
modified_base                   1
                                mod_base = OTHER
                                note = modified by acrydite
SEQUENCE: 3
cgatgacgta atacgactca ctatagggnn nnnntttttt ttttttttttt tttn           54

SEQ ID NO: 4                    moltype = DNA  length = 54
FEATURE                         Location/Qualifiers
source                          1..54
                                mol_type = other DNA
                                organism = synthetic construct
modified_base                   1
                                mod_base = OTHER
                                note = modified by acrydite
SEQUENCE: 4
cgatgacgta atacgactca ctatagggnn nnnntgagca gggtctagag caga            54

SEQ ID NO: 5                    moltype = DNA  length = 33
FEATURE                         Location/Qualifiers
source                          1..33
                                mol_type = other DNA
                                organism = synthetic construct
SEQUENCE: 5
acactctttc cctacacgac gctcttccga tct                                   33

SEQ ID NO: 6                    moltype =      length =
SEQUENCE: 6
000

SEQ ID NO: 7                    moltype = DNA  length = 11
FEATURE                         Location/Qualifiers
source                          1..11
                                mol_type = other DNA
                                organism = synthetic construct
SEQUENCE: 7
tcggtcattc a                                                           11

SEQ ID NO: 8                    moltype = DNA  length = 15
FEATURE                         Location/Qualifiers
source                          1..15
                                mol_type = other DNA
                                organism = synthetic construct
SEQUENCE: 8
ctgtctctta tacac                                                       15

SEQ ID NO: 9                    moltype = DNA  length = 14
FEATURE                         Location/Qualifiers
source                          1..14
                                mol_type = other DNA
                                organism = synthetic construct
SEQUENCE: 9
atctgacgct gccg                                                        14

SEQ ID NO: 10                   moltype = DNA  length = 30
FEATURE                         Location/Qualifiers
source                          1..30
```

```
                        mol_type = other DNA
                        organism = synthetic construct
SEQUENCE: 10
tcggcagcgt cagatgtgta taagagacag                                    30

SEQ ID NO: 11           moltype = DNA  length = 21
FEATURE                 Location/Qualifiers
source                  1..21
                        mol_type = other DNA
                        organism = synthetic construct
SEQUENCE: 11
gtctcggcat tcctgctgaa c                                             21

SEQ ID NO: 12           moltype = DNA  length = 20
FEATURE                 Location/Qualifiers
source                  1..20
                        mol_type = other DNA
                        organism = synthetic construct
SEQUENCE: 12
taatacgact cactataggg                                               20

SEQ ID NO: 13           moltype = DNA  length = 64
FEATURE                 Location/Qualifiers
source                  1..64
                        mol_type = other DNA
                        organism = synthetic construct
SEQUENCE: 13
cgatgacgta atacgactca ctatagggat accaccatgg ctctttccct acacgacgct   60
cttc                                                                64
```